(12) United States Patent
Mitsuishi et al.

(10) Patent No.: US 7,376,819 B2
(45) Date of Patent: May 20, 2008

(54) DATA PROCESSOR WITH SELECTABLE WORD LENGTH

(75) Inventors: Naoki Mitsuishi, Kodaira (JP);
Shinichi Shibahara, Kodaira (JP);
Takahiro Okubo, Hanno (JP)

(73) Assignee: Renesas Technology Corp., Tokyo (JP)

( * ) Notice: Subject to any disclaimer, the term of this patent is extended or adjusted under 35 U.S.C. 154(b) by 280 days.

(21) Appl. No.: 10/457,920

(22) Filed: Jun. 11, 2003

(65) Prior Publication Data

US 2004/0003212 A1   Jan. 1, 2004

(30) Foreign Application Priority Data

Jun. 28, 2002   (JP) ............... 2002-191339

(51) Int. Cl.
*G06F 9/30*   (2006.01)
*G06F 9/40*   (2006.01)
*G06F 15/00*  (2006.01)
*G06F 7/38*   (2006.01)
*G06F 9/00*   (2006.01)
*G06F 9/44*   (2006.01)

(52) U.S. Cl. ..................... 712/229; 712/205
(58) Field of Classification Search .......... 712/229, 712/205
See application file for complete search history.

(56) References Cited

U.S. PATENT DOCUMENTS

| 4,466,055 A | 8/1984 | Kinoshita et al. ........... 364/200 |
| 5,317,701 A * | 5/1994 | Reininger et al. ........... 712/207 |
| 5,666,510 A | 9/1997 | Mitsuishi et al. ........... 711/220 |
| 5,687,344 A | 11/1997 | Mitsuishi et al. ........ 395/421.1 |
| 5,699,537 A * | 12/1997 | Sharangpani et al. ....... 712/217 |
| 5,771,363 A | 6/1998 | Mitsuishi et al. ........... 395/376 |
| 5,815,696 A | 9/1998 | Tanaka et al. .............. 395/580 |
| 6,430,674 B1 * | 8/2002 | Trivedi et al. ................ 712/43 |
| 6,502,182 B1 * | 12/2002 | Morishima .................... 712/35 |

FOREIGN PATENT DOCUMENTS

| JP | 56-132624 | 10/1981 |
| JP | 5-241826 | 9/1993 |
| JP | 5-307519 | 11/1993 |
| JP | 6-51981 | 2/1994 |
| JP | 8-263290 | 10/1996 |
| JP | 9-509275 A | 9/1997 |
| JP | 10-21074 | 1/1998 |
| JP | 10-198550 | 7/1998 |
| JP | 2000-357089 | 12/2000 |
| JP | 2000-357096 | 12/2000 |
| JP | 2001-147798 A | 5/2001 |

* cited by examiner

*Primary Examiner*—Eddie Chan
*Assistant Examiner*—Brian P Johnson
(74) *Attorney, Agent, or Firm*—Miles & Stockbridge P.C.

(57) ABSTRACT

An apparatus and method for selecting whether a central processing unit (CPU) performs instruction reading in units of 16 bits (a first word length) or in units of 32 bits (a second word length). Depending on whether instruction reading is performed in units of 16 bits or 32 bits, increment values (+2 and +4) by which a program counter (PC) is incremented are switched. Data reading or writing is performed in units of a given data length irrespective of the selecting unit. When the CPU issues a request for instruction reading in units of 16 bits or 32 bits or for data reading or writing, a bus control unit performs reading or writing a predetermined number of times according to a bus width designated for a resource located at an address specified in the request.

13 Claims, 31 Drawing Sheets

FIG. 3

(GENERAL-PURPOSE REGISTER AND EXTENSION REGISTER)

| | 15           0 | 7           0 | 7           0 |
|---|---|---|---|
| ER0 | E0 | R0H | R0L |
| ER1 | E1 | R1H | R1L |
| ER2 | E2 | R2H | R2L |
| ER3 | E3 | R3H | R3L |
| ER4 | E4 | R4H | R4L |
| ER5 | E5 | R5H | R5L |
| ER6 | E6 | R6H | R6L |
| ER7(SP) | E7 | R7H | R7L |

(CONTROL REGISTER)

| | 31           0 |
|---|---|
| PC | |

| | 7           0 |
|---|---|
| CCR | I UI H U N Z V C |

| | 31           12           0 |
|---|---|
| VBR | 0 0 0 0 0 0 0 0 0 0 0 0 |

FIG. 5

(1) OPERATION FIELD ONLY

| op |
|----|

EX.: NOP

| 0000 |
|------|

(2) OPERATION FIELD AND REGISTER SPECIFICATION FIELD

| op | r1 | r2 |
|----|----|----|

EX.: ADD.W R0, R1

| 09 | 0 | 1 |
|----|---|---|

(3) OPERATION FIELD, REGISTER SPECIFICATION FIELD, AND EA EXTENSION FIELD

| op | r1 | r2 | EA |
|----|----|----|----|

EX.: MOV.W R2, @(0010, R3)

| 6F | 0 | 3 | 2 | 0010 |
|----|---|---|---|------|

(4) OPERATION FIELD, CONDITION FIELD, AND EA EXTENSION FIELD

| op | cc | EA |
|----|----|----|

EX.: BEQ $+20

| 4 | 7 | 20 |
|---|---|----|

FIG. 6
(1) MOV INSTRUCTION
MOV.W @rs,rd
MOV.W @aa:16, rd
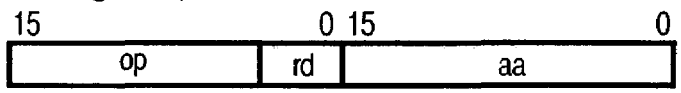
(2) JMP INSTRUCTION
JMP @a:32
(3) BRANCH INSTRUCTION
BRA d:8
BRA/S d:8
(4) SHIFT INSTRUCTION
SHLL.L #xx,rd
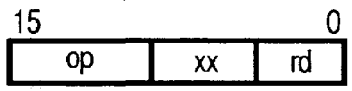
(5) MULTIPLICATION INSTRUCTION
MULU.W rs, rd
MULU.L rs, rd
MULU/UP.L rs, rd
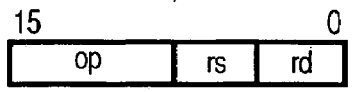
MULU.W #x:4, rd
MULU.L #x:4, rd
MULU/UP.L #x:4, rd
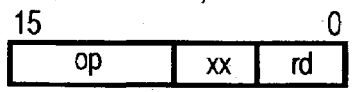

FIG. 7

```
always @ (if or ifw or mode16 or iab1 or ...)
    casez ( {if, ifw, mode16, iab1} )
        4' b1000 :      BCMD = 'longread ;
        4' b1001 :      BCMD = 'wordread ;
        4' b101? :      BCMD = 'wordread ;
        4' b?1?? :      BCMD = 'wordread ;
        ...
    endcase
```

FIG. 8

```
always @ (if or mode16 or iab1 or ...)
    casez ( {if, mode16, iab1} )
        3' b100 :   c_inc = 'inc4 ;
        3' b101 :   c_inc = 'inc2 ;
        3' b11? :   c_inc = 'inc2 ;
        ...
    endcase
```

FIG. 9

```
always @ (if or mode16 or iab1 or
           pstinc or size or ...)
  casez ( {if, mode16, iab1, pstinc, size} )
     5' b100?? :      c_inc = 'inc4 ;
     5' b101?? :      c_inc = 'inc2 ;
     5' b11??? :      c_inc = 'inc2 ;
     5' b0?101 :      c_inc = 'inc1 ;
     5' b0?110 :      c_inc = 'inc2 ;
     5' b0?111 :      c_inc = 'inc4 ;
     ...
  endcase
```

FIG. 10

```
always @ ('S1 or 'S2 or opcode or sftcnt )
  case ( 1' b1 )
    'S1 :
      casez ( opcode [5 : 4] )
        2' b?1 :       {sft1, sft2} = 2' b10 ;
        2' b10 :       {sft1, sft2} = 2' b01 ;
        2' b00 :       {sft1, sft2} = 2' b00 ;
      endcase
    'S2 :
      casez ( sftcnt [1 : 0] )
        2' b10 :       {sft1, sft2} = 2' b01 ;
        2' b00:        {sft1, sft2} = 2' b00 ;
        default :      {sft1, sft2} = 2' bxx ;
      endcase
    default :          {sft1, sft2} = 2' b00 ;
```

FIG. 11

```
always @ ('S1 or 'S2 or 'S3 or opcode or sftcnt )
  case ( 1' b1 )
    'S1 :
      casez ( opcode [8 : 6] )
          3' b??1 :  {sft4, sft8, sft16} = 3' b100 ;
          3' b?10 :  {sft4, sft8, sft16} = 3' b010 ;
          3' b100 :  {sft4, sft8, sft16} = 3' b001 ;
          3' b000 :  {sft4, sft8, sft16} = 3' b000 ;
      endcase
    'S2 :
      casez ( sftcnt [4 : 2] )
          3' b?10 :  {sft4, sft8, sft16} = 3' b010 ;
          3' b100 :  {sft4, sft8, sft16} = 3' b001 ;
          3' b000 :  {sft4, sft8, sft16} = 3' b000 ;
          default :  {sft4, sft8, sft16} = 3' bxxx ;
      endcase
    'S3 :
      casez ( sftcnt [4 : 2] )
          3' b100 :  {sft4, sft8, sft16} = 3' b100 ;
          3' b000 :  {sft4, sft8, sft16} = 3' b000 ;
          default :  {sft4, sft8, sft16} = 3' bxxx ;
      endcase
    default :      {sft4, sft8, sft16} = 3' b000 ;
```

FIG. 12

```
always @ ('S1 or 'S2 or opcode or sftcnt )
  case ( 1' b1 )
    'S1 :
      casez ( opcode [5 : 4] )
        2' b?1 :      sftcnt [1 : 0] = {opcode [5] , 1' b0}
        2' b10 :      sftcnt [1 : 0] = 2' b00 ;
        2' b00 :      sftcnt [1 : 0] = 2' b00 ;
      endcase
    'S2 :             sftcnt [1 : 0] = 2' b00 ;
    default :         sftcnt [1 : 0] = 2' b00 ;
always @ ('S1 or 'S2 or 'S3 or opcode or sftcnt )
  case ( 1' b1 )
    'S1 :
      casez ( opcode [8 : 6] )
        3' b??1 : sftcnt [3 : 2] = {opcode [8 : 7] , 1' b0} ;
        3' b?10 : sftcnt [3 : 2] = {opcode [8] , 2' b00} ;
        3' b100 : sftcnt [3 : 2] = 3' b000 ;
        3' b000 : sftcnt [3 : 2] = 3' b000 ;
      endcase
    'S2 :
      casez ( sftcnt [4 : 2] )
        3' b?10 :  sftcnt [3 : 2] = {opcode [8] , 2' b00} ;
        3' b100 :  sftcnt [3 : 2] = 3' b000 ;
        3' b000 :  sftcnt [3 : 2] = 3' b000 ;
        default :  sftcnt [3 : 2] = 3' bxxx ;
      endcase
    'S3 :             sftcnt [3 : 2] = 3' b000 ;
    default :         sftcnt [3 : 2] = 3' b000 ;
```

FIG. 15

```
always @ (sftl or sftr or sft1 or sft2 or gb)
    casez ( {sftl, sftr, sft1, sft2} )
        4' b10_10 :      sft1_out = gb<<1 ;
        4' b10_01 :      sft1_out = gb<<2 ;
        4' b01_10 :      sft1_out = gb>>1 ;
        4' b01_01 :      sft1_out = gb>>2 ;
        4' b??_00 :      sft1_out = gb ;
        default :        sft1_out = 32' hxxxxxxxx ;
    endcase
```

FIG. 16

```
always @ (sftl or sftr or sft4 or sft8 or
          sft16 or sft1_out))
    casez ( {sftl, sftr, sft4, sft8, sft16} )
        5' b10_100 :     sft_out = sft1_out<<4 ;
        5' b10_010 :     sft_out = sft1_out<<8 ;
        5' b10_001 :     sft_out = sft1_out<<16 ;
        5' b01_100 :     sft_out = sft1_out>>4 ;
        5' b01_010 :     sft_out = sft1_out>>8 ;
        5' b01_001 :     sft_out = sft1_out>>16 ;
        5' b??_000 :     sft_out = sft1_out ;
        default :        sft_out = 32' hxxxxxxxx ;
    endcase
```

FIG. 17

```
5' b10_1?? :    sft_out = {sft1_out [27 : 0] , 4' h0} ;
5' b10_01? :    sft_out = {sft1_out [23 : 0] , 8' h00} ;
```

DATA PROCESSOR WITH SELECTABLE WORD LENGTH

BACKGROUND OF THE INVENTION

The present invention relates to a data processor, or more particularly, to a technology effectively utilized for, for example, a central processing unit (CPU), or a microcomputer or data processor including the CPU.

A microcomputer realized with semiconductor integrated circuits has undergone extension of an address space, expansion of an instruction set, or an increase in a processing speed. For example, Japanese Unexamined Patent Publication No. Hei5(1993)-241826 or No. Hei6(1994)-51981 describes an example of a microcomputer that has the address space thereof extended or the instruction set thereof expanded while maintaining the interchangeability on an object level.

Moreover, Japanese Unexamined Patent Publication No. Hei8(1996)-263290 describes an example of a microcomputer whose CPU is interchangeable with a CPU that executes basic instructions in two execution states, and whose processing is so fast as to execute the basic instructions while bringing them into one state. Furthermore, the microcomputer enjoys really fast processing owing to incorporation of a multiplier independent of the CPU.

Owing to the realization of fast processing, equipment to be controlled by a microcomputer can be designed to operate fast or can be sophisticated. Otherwise, a microcomputer that conventionally consists of a plurality of semiconductor integrated circuits can be designed compactly by integrating the semiconductor integrated circuits with one another.

The present inventor has made the proposal described below in the previous application (Japanese Unexamined Patent Publication No. 2000-357089). Namely, the width of an internal data bus is made larger than at least a basic unit of an instruction (for example, a word). An instruction register is included for holding a plurality of units of a read instruction. A means is included for monitoring the number of bits representing an instruction present in the instruction register. Based on a basic unit execution time (during which one execution state persists), an instruction is executed so that the instruction will be read in one execution state and a program counter (PC) will be incremented at the same time, and the instruction will have an effective address thereof calculated or undergo a data operation in another execution state. An execution state in which the instruction is merely read can therefore be omitted. In response to a direction given by the monitoring means, the execution state in which the instruction is merely read is omitted (skipped) depending on the number of bits representing the instruction present in the instruction register. Consequently, the number of bits to be read as an instruction during instruction execution is increased or decreased based on the instruction length. Thus, it is intended to reduce the number of execution states and achieve fast processing.

SUMMARY OF THE INVENTION

The present inventor et al. have discussed hardware needed to achieve fast processing in a microcomputer or the like. In the course of the discussion, consideration is taken into the points described below.

For the control of a microcomputer realized with a single chip or equipment, it is important to reduce an interrupt response time. A CPU recognizes various events, which occur in an object of control or within a microcomputer, as interrupts, and runs a predetermined program according to an interrupt. In order to realize desired control using various resources of a microcomputer, the capability to extend desired control in real-time, that is, within a predetermined time responsively to occurrence of a predetermined event must be improved.

The present inventor et al. have discussed the point that a logical or physical scale should desirably be minimized. When a microcomputer is realized with a single chip containing a read only memory (ROM) as a program memory, since the storage capacity of the built-in ROM is smaller than that of an externally connected memory, it is desired to reduce a program size.

In recent years, it has become almost a matter of common practice to adopt a flash memory that can be electrically programmable and erasable or an EEPROM (electrically erasable and programmable ROM) as a ROM to be incorporated in a single-chip microcomputer. The electrically erasable and programmable memory is realized with a large memory device. Moreover, a high-voltage generation circuit for programming and erasing is required. The electrically erasable and programmable memory is therefore large in physical scale. It is therefore greatly desired to reduce a program size. The same applies to a built-in RAM (which stands for a random access memory). Namely, a data length to be employed should be as small as possible.

More and more programs to be installed in microcomputers are described using a high-level language such as C language. When a program is described using a high-level language, compared with when a program is described using an assembly language, a program size and a data length employed are likely to increase. From this viewpoint, the present inventor has noticed that it is more important for fast processing to realize the points described below than the hardware-related point.

(1) [Bus Mode]

A means for achieving fast processing by realizing a 32-bit internal bus would prove effective when a bus width can be expanded like the one of a bus on which a built-in ROM is connected. The range of applications of microcomputers is wide and programs are often saved in an external memory. When the external memory is employed, the 32-bit bus imposes many restrictions in the aspects of an area of wiring, the number of pins included in a microcomputer, and the price of a memory employed. By the way, it is possible for a CPU to request instruction reading in units of 32 bits. The reading of 32 bits can be achieved with two times of reading of 16 bits. However, the CPU has to wait until 32 bits the CPU has requested are read. When a branch instruction or the like is issued, excessively read bits of an instruction are wasted (unused). Meanwhile, the CPU remains in the wait state. Both the read bits and the time during which the CPU is in the wait state are wasted. Even an interrupt is not treated, whereby a so-called interrupt response time increases. Japanese Unexamined Patent Publication No. Sho56(1981)-132624 describes a case where a bus width designation signal is received through an input/output terminal and actions are switched accordingly. However, consideration is not taken into an instruction.

(2) [Delay Branch]

In a microcomputer having a pipeline fixed therein, such as, a reduced instruction set computer (RISC) type microcomputer, a delay branch may be caused in order to process a branch instruction fast and simplify an internal logical structure. A branch instruction and a preceding instruction are switched and then executed. The switched branch instruction shall be called a delay branch instruction and the switched preceding instruction shall be called a delay slot instruction. Japanese Unexamined Patent Publication No. Hei10(1998)-21074 describes a case where a delay branch is applied to a variable-length instruction code. This case is described on the assumption that a Harvard bus is employed and different processing stages of pipelining are uniform. Moreover, if instructions directing the same branch are delay branch instructions alone, there is no instruction capable of being allocated to a delay slot period. A no-operation (NOP) instruction is therefore allocated to the delay slot period. This invites an increase in the number of undesired instructions or an increase in a program size.

(3) [A Plurality of Bit Shifts]

When bits are shifted a plurality of times, it is known that a so-called barrel shifter is employed. For the barrel shifter, refer to, for example, Japanese Unexamined Patent Publication Hei 10(1998)-198550.

On the other hand, a CPU performs a plurality of operations, and computing units for performing the respective operations must be included. The operations include, for example, in addition to a shift operation, arithmetic operations and logical operations. These operations do not require series arrangement of bit positions (shifting of the result of addition or the like). The bit positions are therefore arranged in parallel. In order to raise the operating frequency of the CPU, a computing unit capable of producing the largest delay must be designed to process data fast. In other words, the delay produced by the computing unit that produces the largest delay among the computing units is tolerable by the other computing units. In general, an arithmetic unit is likely to produce a large delay because of a carry time.

When a plurality of bit shifts is performed, if a barrel shifter is unemployed, a required number of shift instructions each directing a shift of one bit position is described, or a program loop is described. In order to shift five bit positions, the former description may be structured as follows:

```
SHLL.L #1, ER1
SHLL.L #1, ER1
SHLL.L #1, ER1
SHLL.L #1, ER1
SHLL.L #1, ER1
```

The latter description may be structured as follows:

```
MOV.B #5,  ROL
SHLL.L #1, ER1
DEC.B #1,  ROL
BNE        L1
```

Although the frequency of occurrence is not high, an increase in a program size is invited.

(4) [Multiplier]

When a multiplier must be incorporated, a multiplier that treats a multiplier, a multiplicand, and a product which have the same data length, such as, a multiplier that provides a product of 16 bits long by multiplying 6 bits by 16 bits is often adopted according to a data type, which is adopted for a source program written in C language, other than a multiplier that provides a product of 16 bits long by multiplying 8 bits by 8 bits. Moreover, a programming technique that employs multiplication instead of constant division is known through Japanese Unexamined Patent Publication No. 2000-357096.

An object of the present invention is to achieve fast data processing in terms of hardware, or more particularly, to achieve fast data processing with the operating frequency of hardware held unchanged. In short, an object of the present invention is to decrease the number of execution states needed to perform predetermined processing.

Another object of the present invention is to provide a data processor capable of improving the use efficiency of resources, to provide a data processor capable of improving user-friendliness, or to provide a data processor capable of minimizing a program size.

The above and other objects of the present invention and the novel features thereof will be apparent from the contents of this specification and the appended drawings.

BRIEF DESCRIPTION OF THE DRAWINGS

FIG. 3 is an explanatory diagram presenting the configurations of general-purpose registers and control registers which are incorporated in the CPU;

FIG. 5 is an explanatory diagram showing an example of an instruction format for a machine language unique to the CPU;

FIG. 6 is an explanatory diagram presenting concrete formats for several typical instructions relating to the present invention;

FIG. 7 is an explanatory diagram presenting a logical description concerning instruction reading to be performed by a bus access control unit BCNT;

FIG. 8 is an explanatory diagram presenting a logical description concerning the contents of control to be extended to a prefetch counter pfc by an incrementer INC;

FIG. 9 is an explanatory diagram presenting a logical description containing a control instruction that directs selecting of +1, +2, or +4 according to a data length so as to increase the number of entry conditions in the logical description shown in FIG. 7 or FIG. 8;

FIG. 10 is an explanatory diagram presenting a logical description concerning the contents of control to be extended by a first shifter;

FIG. 11 is an explanatory diagram presenting a logical description concerning the contents of control to be extended by a second shifter;

FIG. 12 is an explanatory diagram presenting a logical description concerning the ability of a control signal sftcnt;

FIG. 15 is an explanatory diagram presenting a logical description of a control instruction that controls the actions of a first shifter;

FIG. 16 is an explanatory diagram presenting a logical description of a control instruction that controls the actions of a second shifter;

FIG. 17 is an explanatory diagram presenting other descriptions concerning first and second cases of the logical description shown in FIG. 16;

Figure 1:
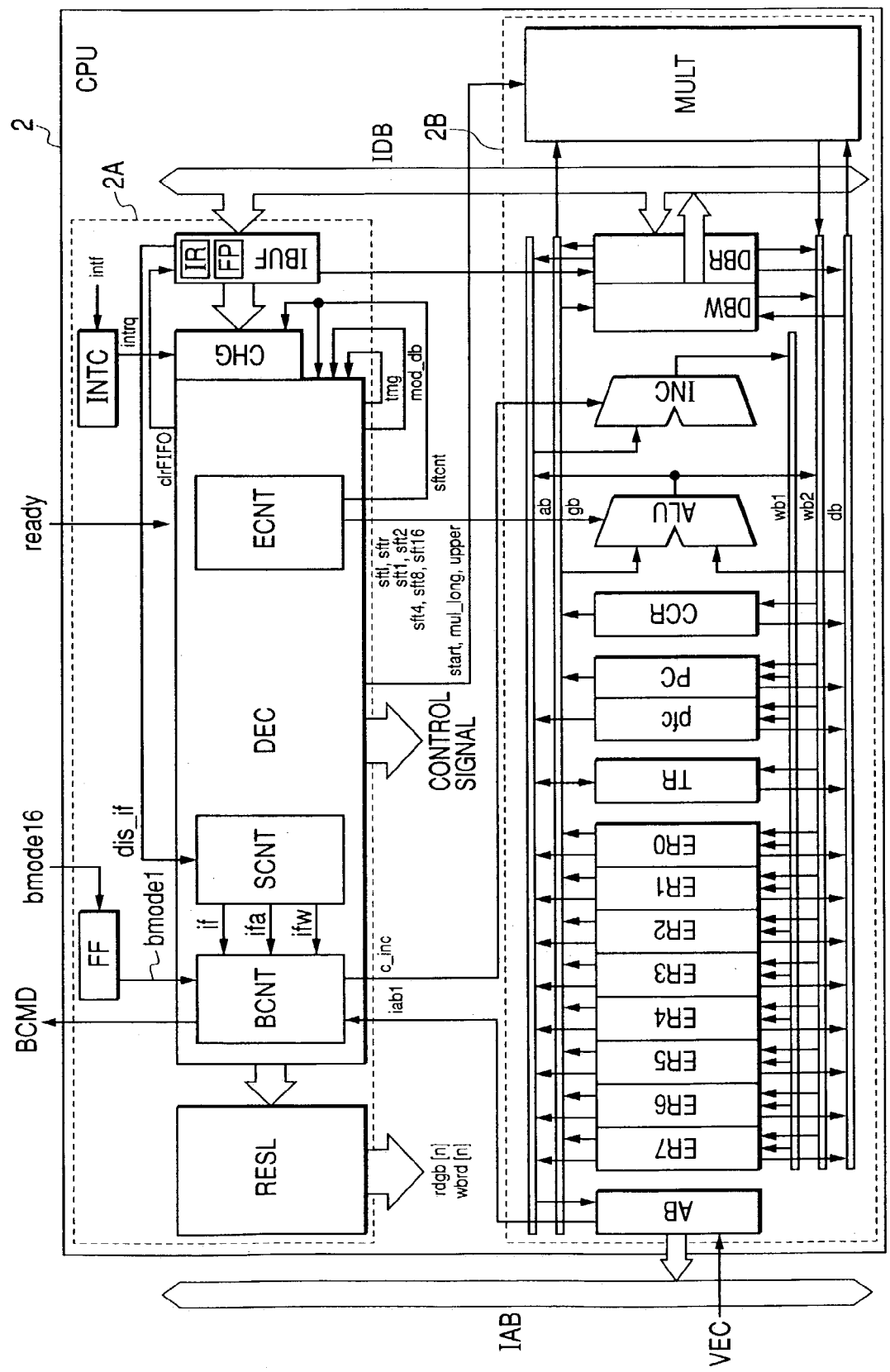
FIG. 1 is a block diagram showing the details of a CPU that is an example of a data processor in accordance with the present invention.

The constituent features of the present invention to be disclosed in this applicant will be briefed below (1) [Bus Mode]

A means is included for selecting whether a CPU performs instruction reading in units of, for example, 16 bits (a first word length) or 32 bits (a second word length). Depending on whether instruction reading is performed in units of 16 bits or 32 bits, increment values (+2 and +4) by which a program counter is incremented are switched. Data reading or writing is performed in units of a given data length irrespective of the selecting means. Specifically, a data processor in accordance with the aspect of the present invention concerning a bus mode includes an instruction executing means (CPU) that reads and interprets an instruction, and executes the instruction according to the result of the interpretation. The instruction executing means includes: a register in which data or an address can be saved; a selecting means that selects a word length in units of which instruction reading is performed; and a control means (DEC) that produces a bus control signal (BCMD) which permits instruction reading in units of the word length selected by the selecting means, and switches increment values (+2 and +4), by which an instruction prefetch counter (pfc) is incremented, according to the selected word length. Data reading or writing is performed in units of a given word length irrespective of the selecting means. For example, the CPU issues a request for instruction reading in units of 16 bits or 32 bits or for data reading or writing. A bus controller performs reading or writing a predetermined number of times according to a bus width designated for a resource located at an address specified in the request. The bus controller requests the CPU to wait until 16 bits or 32 bits (read data) of an instruction is prepared in compliance with the request issued from the CPU.

When a required number of bits to be read as an instruction is small, for example, when execution of a branch instruction is started, instruction reading is forcibly performed in units of 16 bits (a small word length). When a branch instruction or an interrupt exception is treated, the CPU starts decoding a leading instruction located at a branch target at the time of completion of pre-fetching of one word at minimum, and then executes the decoded instruction.

As for data, a data reading or writing request is issued in order to read or write a required number of bits. Therefore, no data is wasted.

When the control means decodes an instruction code representing a branch instruction so as to execute the instruction, the control means reads an instruction from a branch target. The instant the control means completes receiving the instruction read from the branch target, the control means interrupts the instruction read from the branch target.

The data processor may further include a built-in ROM and an external bus means over which an externally coupled memory can be accessed. At this time, it can be selected whether the bus width of the external bus means is made smaller than the bus width of a bus on which the built-in ROM is coupled. Otherwise, the bus width of the bus on which the built-in ROM is coupled is larger than the bus width of the external bus means.

In a preferred form of the present invention, control information, based on which the selecting means selects a word length, can be selected by executing an instruction. An initial value of the control information represents a relatively larger word length.

(2) [Delay Branch]

A branch target instruction read in response to a delay branch instruction is held in a dedicated register (IR) serving as a second holding means. When a delay slot instruction is terminated, an instruction buffer (FB) serving as a first holding means is cleared. Specifically, a data processor includes an instruction executing means that reads and interprets an instruction, and executes the instruction according to the results of the interpretation. The instruction executing means includes the first holding means (FB) that holds an instruction code, and the second holding means (IR). A branch target instruction read in response to a delay branch instruction is held in the second holding means (IR). The first holding means (FB) holds the preceding instruction. When a delay slot instruction is terminated, the first holding means (FB) is cleared.

A count value of a prefetch counter (pfc) representing a branch address is held in a temporal register means (TR). Even when the length of an instruction code representing a delay slot instruction is long, instruction reading can be continued based on the count value of the prefetch counter. The delay slot instruction may be able to be executed in a plurality of execution states. Consequently, the number of bits constituting an instruction to be allocated to a delay slot period can be increased, a delay branch can be utilized effectively, user-friendliness can be improved, the use efficiency of resources can be improved, and fast processing can be realized. Specifically, the instruction executing means further includes the prefetch counter (pfc), and the temporary register means (TR) used to temporarily hold information. A branch target address or a value produced by incrementing the branch target address is held in the temporary register means (TR) in response to a delay branch instruction. The prefetch counter indicates an address succeeding an address from which an instruction is read before reading of a branch target instruction. When a delay slot instruction is executed, the prefetch counter is usable. When the delay slot instruction is terminated, the contents of the temporary register means (TR) or a value produced by incrementing the contents of the temporary register means is pre-set in the prefetch counter. In order to conceal a latency required for branch instruction reading when a branch takes place rather than to suppress a disorder in pipelining, an instruction to be executed in a plurality of execution states is allocated to a delay slot period. Thus, the number of execution states can be reduced.

When an instruction allocated to a delay slot period enters an execution state in which data of an instruction code representing the instruction is read or an execution state in which an effective address thereof is calculated, instruction reading is disabled. Consequently, reading (pre-fetching) of an instruction that is not utilized can be suppressed. An increase in the number of execution states caused by insertion of a wait state can be avoided.

The instruction executing means can execute both the delay branch instruction and a branch instruction which does not include a delay branch and which is addressed in the same addressing mode as the delay branch instruction. In short, the instruction executing means addresses the branch instruction and delay branch instruction in the same addressing mode. Even if no instruction can be allocated to a delay slot, a no-operation (NOP) instruction that is not desired will not be allocated to the delay slot.

(3) [A Plurality of Bit Shifts]

Shifters (shifting circuits) that treat a fixed number of bits equivalent to the power of 2 are connected in series with each other in two stages. The first and second shifters connected in series with each other are connected in parallel with an arithmetic and logic unit. For example, when a 32-bit operation is enabled, the first shifter performs a right or left shift of a first or second number of bit positions (1 or 2), and the second shifter performs a right or left shift of a third, fourth, or fifth number of bit positions (4, 8, or 16). Moreover, a no-shift operation can be selected.

A control unit controls the two stages of shifters. During instruction execution, the control unit verifies the number of bit positions to be shifted. The control unit directs a shift in a first direction or a shift in a second direction, and directs either or both of the first and second shifters to perform a shift operation. During instruction execution, if one shift performed by the first or second shifter is insufficient, the control unit informs the number of remaining bit positions to be shifted (sftcnt). When the instruction enters its next execution state, a shift is continuously performed. Meanwhile, an interrupt is inhibited. For example, the number of bit positions to be shifted (1, 2, 4, 8, or 16 bit positions) of which frequency of occurrence is high can be shifted as directed in one execution state of the instruction. When a 32-bit operation is performed, up to the first, second, third, fourth, and fifth numbers of bits are shifted once as operations directed in three different execution states of the instruction. Consequently, any bit positions can be shifted.

A barrel shifter includes right and left selectors that select any of 64 options. In a plurality-of-bit shifts circuit relevant to the foregoing means, a first shifter should merely include a selector that selects any of five options, and a second shifter should merely include a selector that selects any of seven options. Thus, any number of bit positions to be shifted can be selected as well as any shifting direction can be designated, and a no-shift operation can also be designated. This leads to a reduction in a logical scale. Moreover, the first and second shifters are connected in parallel with the arithmetic and logic unit. A delay time given by the plurality-of-bit shifts circuit relevant to the aforesaid means can be made equal to the delay time given by the arithmetic and logic unit, whereby an increase in the delay time can be deterred. The employment of the plurality-of-bit shifts circuit relevant to the aforesaid means can minimize a program size more successfully than when a required number of shift instructions each directing a shift of one bit position is described or when a program loop is described.

(4) [Multiplier]

A data processor in accordance with the present invention includes an instruction executing means. The instruction executing means includes a multiplying means that produces a product, which is composed of a second number of bits, by multiplying a multiplicand, which is composed of a first number of bits, by a multiplier composed of the first number of bits. The multiplying means is used to execute a first multiplication instruction (MUL.W), a second multiplication instruction (MUL.L), and a third multiplication instruction (MUL/UP). Herein, the first multiplication instruction directs acquisition of the low-order bits of a product, which is composed of the first number of bits, of the multiplicand composed of the first number of bits by the multiplier composed of the first number of bits. The second multiplication instruction directs acquisition of the low-order bits of a product, which is composed of the second number of bits, of a multiplicand composed of the second number of bits by a multiplier composed of the second number of bits. The third multiplication instruction directs acquisition of the higher-order bits of a product, which is composed of the second number of bits, of the multiplicand composed of the second number of bits by the multiplier composed of the second number of bits. For example, a multiplier adopts the multiplication logic that a multiplication instruction directing calculation of a 32-bit product of 16 bits by 16 bits is executed in one execution state. The multiplier is used to execute the multiplication instruction, which directs multiplication of 16 bits by 16 bits, in one execution state. A multiplication instruction directing acquisition of the 32 low-order bits of a product of 32 bits by 32 bits is executed in four execution states. A multiplication instruction directing acquisition of the 32 high-order bits of the product of 32 bits by 32 bits is executed in five execution states.

The multiplier acts in response to a start signal (start), a control signal (mul_long) indicating the number of bits to be multiplied, and a control signal (upper) representing the high-order bits calculated by the multiplier. The multiplier changes the states thereof. When the multiplication instruction directing acquisition of the 32 high-order bits of a product of 32 bits by 32 bits is employed in division, the multiplication instruction will contribute to improvement of the efficiency in division.

DESCRIPTION OF THE PREFERRED EMBODIMENTS

Figure 2:
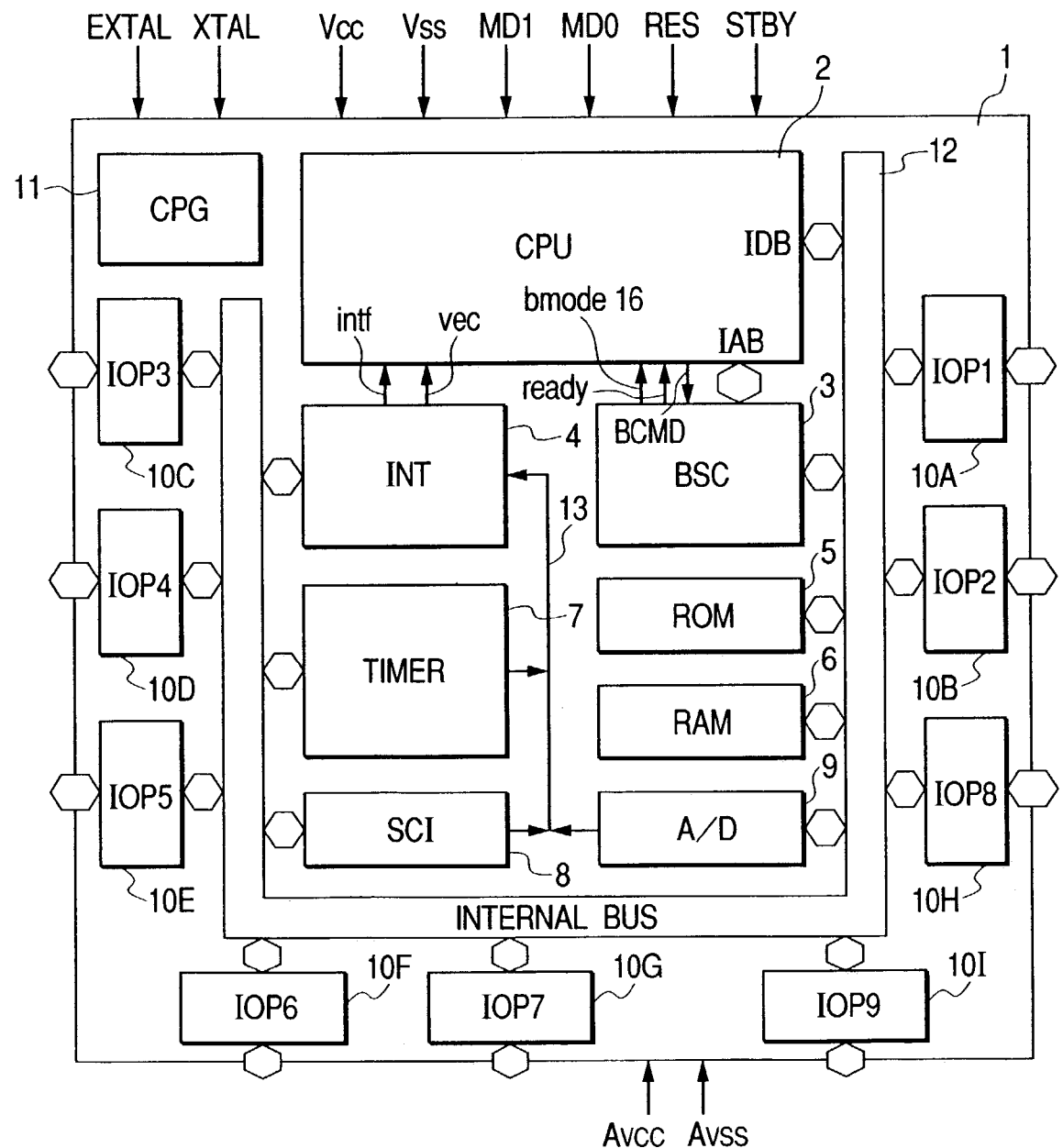
FIG. 2 is a block diagram showing a single-chip microcomputer to which a data processor in accordance with the present invention is adapted.

FIG. 2 is a block diagram showing a single-chip microcomputer to which a data processor in accordance with the present invention is adapted.

A single-chip microcomputer 1 shown in FIG. 2 comprises functional blocks or modules serving as: a CPU 2 that is responsible for the control of the whole; a bus controller (bus state controller, BSC) 3; an interrupt controller (INT) 4; a ROM 5 that is a memory in which processing programs to be run by the CPU 2 are stored; a RAM 6 that is a memory which is used as a work area by the CPU 2 and in which data is temporarily stored; a timer 7; a serial communication interface (SCI) 8; an A/D converter (analog/digital converter) 9; first to ninth input/output ports (IOP1 to IOP9) 10A to 10I; and a clock oscillator (clock pulse generator, CPG) 11. A known semiconductor integrated circuit manufacturing technology is used to form the microcomputer on one semiconductor substrate (semiconductor chip).

The single-chip microcomputer 1 has as power terminals to which a ground-level voltage (Vss), a supply voltage (Vcc), an analog ground-level voltage (AVss), and an analog supply voltage (AVcc) are applied. Furthermore, a reset terminal (RES), a standby terminal (STBY), mode control terminals (MD0 and MD1), and clock input terminals (EXTAL and XTAL) are included as dedicated control terminals.

The input/output ports 10A to 10I are used as the input/output terminals through which a signal on an address bus, a signal on a data bus, and a bus control signal are received or transmitted, or used as the input/output terminals of the timer 7, SCI 8, and A/D converter 9.

Crystal oscillators are connected to the terminals EXTAL and XTAL of the CPG 11, and an external clock is applied to the EXTAL terminal. Synchronously with a reference clock (system clock) produced based on the external clock, the single-chip microcomputer 1 performs actions. One cycle of the reference clock shall be called a state period.

The functional blocks of the single-chip microcomputer 1 are interconnected over an internal bus 12. The internal bus 12 consists of an address bus, a data bus, and a control bus. Bus commands produced by encoding a Read signal, a Write signal, and a bus width signal are transmitted over the control bus.

The functional blocks or modules are read or written by the CPU 2 over the internal bus 12. The width of the internal bus 12 is, for example, 32 bits. The built-in ROM 5 and RAM 6 can be read or written by taking one state period. Control registers included in the bus controller 3, interrupt controller 4, timer 7, SCI 8, A/D converter 9, input/output ports 10A to 10I, and CPG 11 shall be generically called internal I/O registers.

The bus controller (BSC) 3 receives a bus command BCMD from the CPU 2 and receives an address signal over the address bus IAB, and controls the internal bus in a given manner. In association with an address designated over the address bus IAB, an inherent or selected bus width and an inherent or selected number of access state periods are determined. Accordingly, instruction reading or data reading or writing requested by the CPU 2 is achieved. At this time, a Ready signal ready is returned as a response signal relative to the request for instruction reading or data (bus command) reading or writing issued from the CPU 2. When the Ready signal ready is inactive, the CPU 2 is brought to a wait state.

The bus controller 3 has a control bit bmode16 held in the internal I/O register thereof. When the control bit bmode16 is a 0, a 32-bit instruction fetch mode is designated. When the bit bmode16 is a 1, a 16-bit instruction fetch mode is designated, and a control signal bmode16 is transmitted to the CPU 2. The control bit bmode16 is reset or cleared to 0. In the 32-bit instruction fetch mode, even when a memory connected over the 16-bit bus is read, unless the processing sequence of a program is changed by inserting a branch instruction or an interrupt, a waste will not occur. Normally, after the control bit bmode16 is reset, an interrupt is masked or inhibited. Prior to initialization, the control bit bmode16 should be set to 1.

When a Reset signal RES is transmitted to the single-chip microcomputer 1, the single-chip microcomputer 1 including the CPU 2 is reset. When the reset state is lifted, the CPU 2 handles a reset exception, that is, reads a start address from a predetermined address (reset vector) and starts reading an instruction from the start address. Thereafter, the CPU 2 sequentially reads an instruction from the ROM 5 or the like, and interprets it. Based on the contents of the interpreted instruction, the CPU 2 treats data or transfers data to or from the RAM 5, timer 7, SCI 8, or input/output ports 10A to 10I.

The state of the timer 7, SCI 8, or external signal may be transmitted as an interrupt signal to the CPU 2. Specifically, an interrupt signal 13 is transmitted from a predetermined circuit such as the A/D converter 9, timer 7, SCI 8, or input/output ports 10A to 10I, and received by the interrupt controller 4. Based on a designation held in a predetermined register, an interrupt request signal intf and a vector vec corresponding to a handled interrupt are transmitted to the CPU 2. If a factor of an interrupt occurs, a CPU2 interrupt request is generated. The CPU 2 suspends processing that is under way, handles an exception, reads a branch target address from an address associated with the vector vec, causes a branch to a predetermined routine, performs desired processing, and thus overcomes the factor of an interrupt. At the end of the predetermined routine, a normal restoration instruction is described. By executing the instruction, the suspended processing is restarted.

FIG. 3 shows an example (programming model) of the structures of general-purpose registers and control registers incorporated in the CPU 2.

The CPU 2 has eight general-purpose registers ER0 to ER7 each of which holds data of 32 bits long. The general-purpose registers ER0 to ER7 share the same capability and may be used as address registers or data registers.

When the general-purpose registers ER0 to ER7 are used as data registers, they can serve as 32-bit, 16-bit or 8-bit registers. When the general-purpose registers ER0 to ER7 must be used as address registers or 32-bit registers, they are regarded generically as general-purpose registers ER (ER0 to ER7). When the general-purpose registers ER0 to ER7 must be used as 16-bit registers, the general-purpose registers ER are divided into general-purpose registers E (E0 to E7) and general-purpose registers R (R0 to R7). The general-purpose registers E and R share the same capability. Up to sixteen 16-bit registers can be used. When the general-purpose registers ER0 to ER7 must be used as 8-bit registers, the general-purpose registers R are divided into general-purpose registers RH (R0H to R7H) and general-purpose registers RL (R0L to R7L). The general-purpose registers RH and RL share the same capability. Up to sixteen 8-bit registers can be used. A using method can be selected for each register.

The general-purpose register ER7 has, in addition to the capability of a general-purpose register, the capability of a register holding a stack pointer (SP). The general-purpose register ER7 is implicitly used to handle an exception or a branch from a subroutine. When it says that an exception is handled, it includes a case where an interrupt is handled.

A program counter PC is a 32-bit counter and indicates the address of an instruction being executed by the CPU 2. Instructions to be executed by the CPU 2 are all 2 bytes (word) long, though they are not limited to the data length. The least significant bit is invalid. During instruction reading, the least significant bit is regarded as a 0.

A condition code register CCR is an 8-bit register and holds data representing the internal state of the CPU 2. The data is 8 bits long and contains an interrupt mask bit (I), a half carry flag (H), a negative flag (N), a zero flag (Z), an overflow flag (V), and a carry flag (C).

A vector register VBR is a 32-bit register and holds data whose 12 low-order bits are 0s and 20 high-order bits serve as an exception handling vector.

Figure 4:
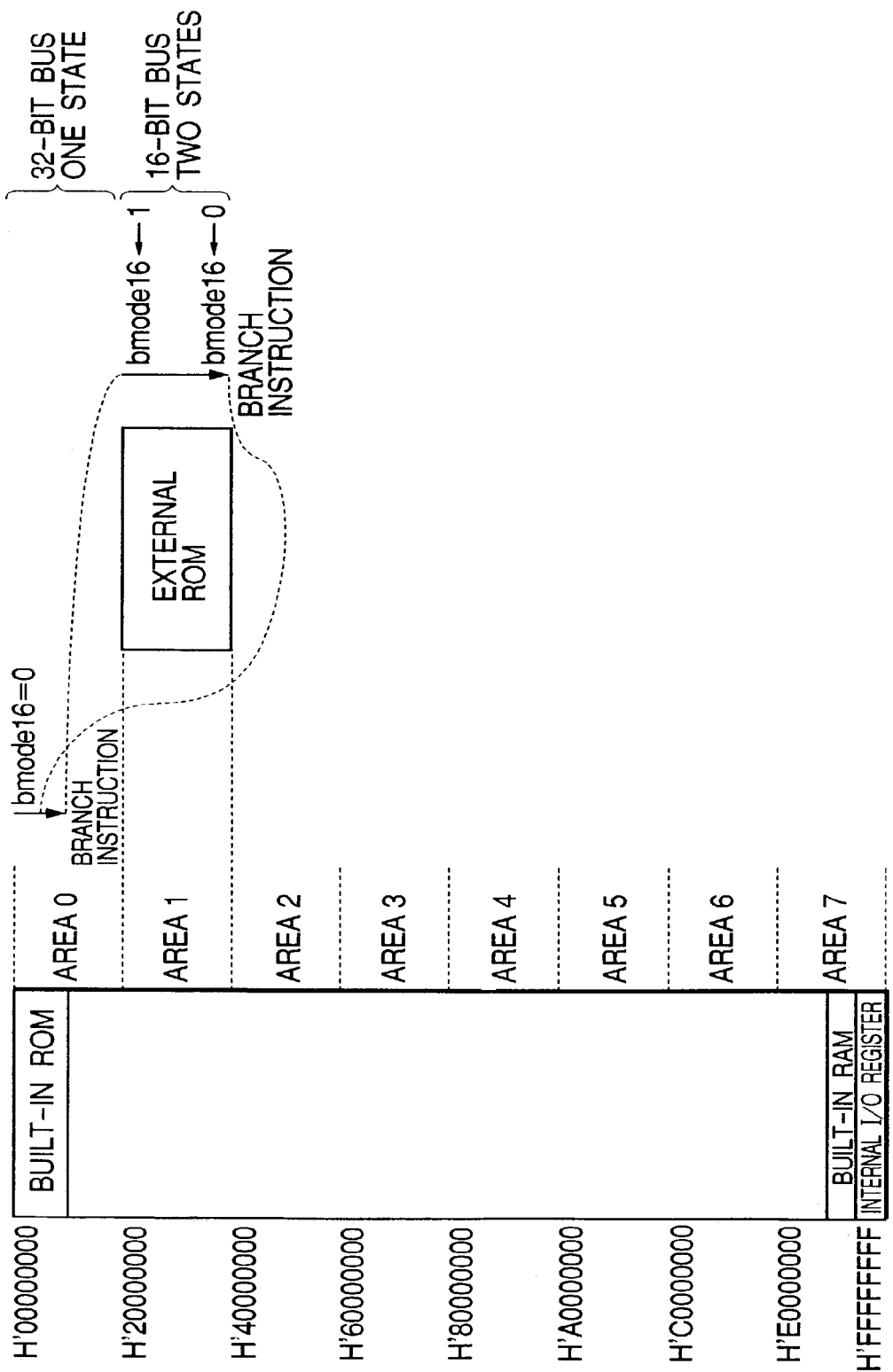
FIG. 4 is an explanatory diagram presenting the address space of the CPU.

FIG. 4 presents the address space of the CPU. The address space of the CPU 2 is 4 gigabytes wide and divided into eight areas. In the areas, a bus width and the number of access state periods can be specified based on the settings of the bus controller 3.

On the other hand, the ROM 5, RAM 6, and internal I/O registers incorporated in the microcomputer 2 operate according to an inherent bus width and an inherent number of access state periods irrespective of the settings of the bus controller 3. As mentioned above, the built-in ROM 5 and RAM 6 are interconnected over the 32-bit bus, and read or written during one state period. The settings of the address space and areas are described in Japanese Unexamined Patent Publication No. Hei5(1993)-307519 or the like.

FIG. 4 also shows a preferred example of switching bus modes. FIG. 4 is concerned with a case where an external ROM 5 that is connected on the 16-bit bus and accessible over two state periods is connected to area 1. When the built-in ROM 5 is used to run a program, since the built-in ROM 5 is connected on the 32-bit bus, the CPU should act in 32-bit mode. The control bit bmode16 is reset to 0, and instruction reading is performed in units of a long word. Consequently, a long word (two words) of an instruction can be read during a unit reading cycle. Even if a subsequent instruction is not executed, no waste occurs. In response to a branch instruction contained in the program present in the built-in ROM 5, a branch is made to the external ROM. A program in the external ROM is then run. Consequently, the control bit bmode16 is set to 1. Hereinafter, instruction reading is performed in units of a word.

Even if the control bit bmode16 is a 0, unless the processing sequence of a program is changed by inserting a branch instruction or an interrupt, no waste is produced. The control bit bmode16 may be changed from a 1 to a 0 or vice versa after a branch is made to the external ROM. When there is a possibility that an interrupt may occur, if an increase in an interrupt response time cannot be permitted, the control bit bmode16 should be set to 1 immediately before a branch to the external ROM takes place.

If a branch is made from the external ROM to the built-in ROM, the foregoing actions are performed in reverse order.

Referring to FIG. 4, after the program residing in the built-in ROM 5 is run, a branch to the external ROM takes place. After the program residing in the external ROM is run, a branch to the built-in ROM 5 takes place. However, a branch may take place any time. A main program may be stored in the external ROM, and a subroutine program (functions) that must be run fast may be stored in the built-in ROM 5. Between the external ROM and built-in ROM 5, a branch from the subroutine or a return to the subroutine is allowed to take place any time. Moreover, the subroutine program (functions) that must be run fast may be stored in the built-in RAM 6. The same applies to the pair of built-in RAM and external RAM.

FIG. 5 shows an example of an instruction format for an instruction written in a machine language which is employed in the CPU 2. Instructions to be executed by the CPU 2 are treated in units of 2 bytes (word). Each instruction includes an operation field (op), a register field (r), an EA extension field (EA), and a condition field (cc).

The operation field (op) is used to indicate the effect of an instruction and to designate the contents of an operand to be addressed in designated addressing mode. Four leading bits of an instruction is contained in the operation field without fail. An instruction format may include two operation fields.

The register field (r) is used to designate a general-purpose register. When the register field (r) is used to designate an address register, 3 bits are contained. When the register field (r) is used to designate a data register, 3 bits (32-bit register) or 4 bits (8 or 16-bit register) are contained. An instruction format may have two register fields or no register field.

The EA extension field (EA) is used to designate immediate data, an absolute address, or a displacement. 8, 16, or 32 bits are contained. The condition field (cc) is used to designate a branch condition for a conditional branch instruction (Bcc).

FIG. 6 shows examples of instruction formats (for instructions to be described later) employed in the present invention.

[Instruction MOV]

MOV.W @rs,rd is an instruction of one word long. Bit positions 6 to 4 are used to designate an address register (rs), and bit positions 3 to 0 are used to designate a data register (rd). MOV.W @aa:16,rd is an instruction of two words long. Bit positions 3 to 0 in a first word are used to designate a data register (rd), and a second word represents an absolute address (aa).

[Instruction JMP]

JMP @aa:32 is an instruction of three words long. Second and third words represent an absolute address (aa).

[Normal Branch Instruction or Delay Branch Instruction]

A normal branch instruction BRA d:8 and a delay branch instruction BRA/S d:8 are instructions of one word long. Bit positions 6 to 1 are used to designate a displacement (d). The displacement (d) is designated by resetting the least significant bit to 0 and interpreting the high-order bits according to a different code through code extension. When bit position 0 in an instruction code is reset to 0, the instruction code is thought to represent a normal branch instruction. When the bit position 0 in an instruction code is set to 1, the instruction code is thought to represent a delay branch instruction.

[Shift Instruction]

SHLL.L #xx,rd is an instruction of one word long. Bit positions 8 to 4 are used to designate immediate data (xx) that represents the number of bit positions to be shifted, and bit positions 3 to 0 are used to designate a destination register (rd).

[Multiplication Instruction]

Instruction MULU.W rs,rd directs acquisition of the 16 low-order bits of a product of 16 bits by 16 bits. Instruction MULU.L rs,rd directs acquisition of the 32 low-order bits of a product of 32 bits by 32 bits. Instruction MULU/UP.L rs,rd directs acquisition of the 32 high-order bits of the product of 32 bits by 32 bits. These instructions are of one word long. Bit positions 7 to 4 are used to designate a source register (rs), and bit positions 3 to 0 are used to designate a destination register (rd). Likewise, MULU.W #x:4,rd, MULU.L #x:4,rd, and MULU/UP.L #x:4,rd are instructions of one word long whose four bits of immediate data are not used to designate the source register but used to designate a multiplier. Namely, bit positions 7 to 4 are used to designate immediate data (xx), and bit positions 3 to 0 are used to designate a destination register (rd).

FIG. 1 shows a detailed example of the CPU 2. The CPU 2 includes a control block (CNT) 2A and an execution block (EXEC) 2B. The control block 2A includes an instruction buffer IBUF, an instruction changer CHG, an instruction decoder DEC, a register selector RESL, and an interrupt control section INTC.

The Ready signal ready is a response signal returned from the bus controller 3 in response to a request for instruction reading or for data reading or writing (bus command) issued from the CPU 2. The Ready signal is an enabling signal with which the CPU 2 is enabled to make a state transition.

The instruction buffer IBUF is a circuit in which a read instruction is temporarily stored. The instruction buffer IBUF is composed of a FIFO buffer FB capable of accommodating 8 words and an instruction register IF capable of holding two words. The instruction register IR is used to issue a branch instruction, and receives an initialization signal clrFIFO sent from the instruction decoder DEC.

An instruction to be executed is transmitted from the instruction buffer IBUF to the instruction decoder DEC. Immediately after instruction reading is completed, the FIFO buffer FB in the instruction buffer IBUF is unused, and an input received directly over the data bus IDB is transmitted to the instruction decoder DEC.

The instruction changer CHG is activated only when an instruction code other than that of a read instruction is transmitted to the instruction decoder DEC. In other cases, the instruction changer CHG transmits the contents of the instruction buffer IBUF to the instruction decoder DEC. An instruction code other than that of a read instruction is used to handle an exception such as an interrupt in response to a direction given by the interrupt control section INTC.

The interrupt control section INTC treats an interrupt request signal intf sent from the interrupt controller 4 shown in FIG. 2. Moreover, the interrupt control section INTC references an interrupt mask signal (not shown) sent from the instruction decoder DEC. If an interrupt is unmasked, the interrupt control section INTC transmits a control signal intrq so as to direct the instruction changer CHG to generate an interrupt. An interrupt is inhibited during the execution time of a plurality-of-bit shifts instruction that is treated between a delay branch instruction and a delay slot instruction which will be described later. The logical description of a signal chg_int which initiates execution of interrupt exception handling is "assign chg_int=intrq & ~(|sftcnt)~& mod_db." Herein, |sftcnt signifies the OR of all the bits of a signal sftcnt, & is an AND sign, and ~ is a reverse sign. The logical descriptions of the control signal sftcnt and modification signal mod_db will be described later.

The instruction decoder DEC is realized with, for example, a micro-ROM, a programmable logic array (PLA), or wired logic, and transmits control signals. The control signals are broadly classified into three kinds of first to third kinds. The first to third kinds of control signals are different from one another in the timings of their being valid. The first control signal (control signal A) is valid during a current state period. The second control signal (control signal B) is valid during the next state period. The third control signal (control signal C) is valid during the state period succeeding the next state period.

Part of an output of the instruction decoder DEC (second control signal) is fed back to the instruction decoder DEC. The part of the output contains a stage code (tmg) used to change stages of execution of each instruction code, a plurality-of-bit shifts control signal sftcnt, and a modification signal mod_db indicating a delay slot.

A signal bmode16 indicating a bus mode is transmitted to the CPU 2. A flip-flop FF receives the signal bmode16. An output signal mode16 of the flip-flop FF is transmitted to the instruction decoder DEC.

The instruction decoder DEC includes an execution sequence control section SCNT, a bus access control section BCNT (bus command BCMD: first control signal), and an execution control section ECNT. The logical description of instruction reading according to which the bus access control section BCNT extends control will be created as briefed below. Namely, when the execution sequence control section SCNT activates a control signal if or ifw that initiates instruction fetching, a bus command is issued according to the logical description (case statement) in FIG. 7. The logical description shown in FIG. 7 is called a register transfer level (RTL) description or a hardware description language (HDL) description, and can be logically developed in a logic circuit using a known logical combination tool. The HDL rules are standardized as the IEEE1364 standard. A syntax applied to the logical description is conformable to the case statement. The contents of the case statement are such that when a value or signal defined in parentheses ( ) following always @ changes, processing described in the subsequent lines is carried out. 4'b1000 signifies a binary code 1000 of 4 bits long. The control signal if initiates instruction reading in units of a long word or word. The control signal ifw initiates forcible instruction reading in units of a word. 'longread or 'wordread specifies a constant defined separately. iab1 signifies bit position 1 in the address bus IAB. An instruction is treated in units of a word (16 bits long), and allocated to an even-numbered address without fail. When iab1=0, the address is a multiple of 4, and a long word can be accessed with one attempt. Specifically, assuming that instruction fetch is directed, an address is a multiple of 4, and the 16-bit bus mode is not adopted, long word reading 'longread is specified in a bus command BCMD. Assuming that instruction fetch is directed, the 16-bit bus mode is adopted, and an address is not a multiple of 4, word reading 'wordread is specified in the bus command BCMD.

FIG. 8 shows the contents of control, which is extended to the prefetch counter pfc by an incrementer INC that will be described later, in the form of a logical description. 'inc4 and 'inc2 specify separately defined constants.

An entry condition is identical to that for the bus command BCMD. When instruction reading is performed in units of a long word, a control signal c_inc is set to a state 'inc4 representing +4. When instruction reading is performed in units of a word, the control signal c_inc is set to a state 'inc2 representing +2.

When the control signal ifw is transmitted, the prefetch counter pfc is not incremented on the assumption that a branch will take place. However, the present invention is not limited to this mode. Herein, the number of entries (entry conditions) in the logical description (case statement) shown in FIG. 7 or FIG. 8 may be increased properly. For example, the entries can be shared with data access to be performed in addressing mode in which addressing is achieved indirectly via a post-increment register. A control instruction for controlling selection of +1, +2, or +4 according to a data length is additionally described. For example, a control signal pstinc initiating execution of indirect addressing via the post-increment register, and a control signal size (byte: 01, word: 10, long word: 11) indicating a data length are used to create a logical description as shown in FIG. 9.

The control of a shifter includes the control of a first shifter, the control of a second shifter, and transmission of a control signal sftcnt. A plurality-of-bit shifts instruction is executed in up to three execution states (S1 to S3). In the first execution state (S1), a shift bit field in an instruction code is referenced in order to perform a shift. In the second and third execution states (S2 and S3), the control signal sftcnt that is a control signal B is referenced.

The control of the first shifter is realized according to a logical description presented in FIG. 10. Referring to FIG. 10, opcode specifies an instruction code (16 bits long) received by the instruction decoder DEC. In FIG. 10, 'S1 and 'S2 specify constants or control signals defined separately in order to indicate the first and second execution states of the plurality-of-bit shifts instruction. Specifically, the control of the first shifter is such that when the plurality-of-bit shifts instruction enters the first execution state (S1), whether a shift is performed one bit position or two bit positions, or no shift is performed is verified in that order in order to produce a control signal sft1 or sft2. When a shift of one bit position is performed in the first execution state of the plurality-of-bit shifts instruction, if a shift of two bit positions is needed in the second execution state (S2) thereof, a two-bit control signal sft2 is produced.

Likewise, the control of the second shifter is realized according to a logical description presented in FIG. 11. The effect of the control signal sftcnt can be specified in a logical description presented in FIG. 12 with the control signal divided into three high-order bits and two low-order bits. When all the bits of the signal sftcnt are 0s, it is verified that the control procedure is terminated.

A register selector RESL produces register selection signals rdgb[n] and wbrd[n] on the basis of a direction given by the instruction decoder DEC and information contained in a register field in an instruction code. The register selector RESL controls the inputs and outputs of general-purpose registers. Herein, [n] specifies a number that ranges from 0 to 7 and that is assigned to each general-purpose register.

The execution block 2B includes general-purpose registers ER0 to ER7, a program counter PC, a prefetch counter pfc, a condition code register CCR, a temporary register TR, an arithmetic and logic unit ALU, an incrementer INC, a read data buffer DBR, a written data buffer DBW, an address buffer AB, and a multiplier MULT. These blocks are interconnected over internal buses ab, gb, db, wb1, and wb2.

The arithmetic and logic unit ALU is used to perform various operations designated by instructions or to calculate an effective address. The incrementer INC is used to give an increment to a count value of the program counter PC. As mentioned above, the direction indicating +1, +2, or +4 by which the count value of the prefetch counter pfc should be incremented is given to the incrementer INC with the control signal c_inc.

Any data other than those held in the general-purpose registers ER0 to ER7, program counter PC, and condition code register CCR which are listed in FIG. 3 cannot be referenced in the course of programming, but used for the actions of the components of the microcomputer 1. Namely, the read data buffer DBR, written data buffer DBW, and address buffer AB are used to temporarily latch or buffer data for the purpose of interfacing with the internal address bus IAB or internal data bus IDB. The temporary register TR is used for the actions of the components of the microcomputer 1. The internal address bus IAB and internal data bus IDB are contained in the internal bus 12.

The read data buffer DBR temporarily holds data read from the ROM 5, RAM 6, internal I/O registers, or an external memory that is not shown. The written data buffer BDW buffers data to be written in the ROM 5, RAM 6, internal I/O registers, or external memory. The address buffer AB temporarily holds an address from or to which the CPU 2 reads or writes data, produces a vector or branch table reading address. The address buffer AB receives a vector from the interrupt controller or receives information over the internal bus ab, and places an address on the address bus IAB. Normally, the contents of the internal bus ab are selected. The multiplier MULT receives a control signal from the instruction decoder DEC or receives data over the internal bus gb or db, and places the result of multiplication on the internal bus wb2.

Figure 13:
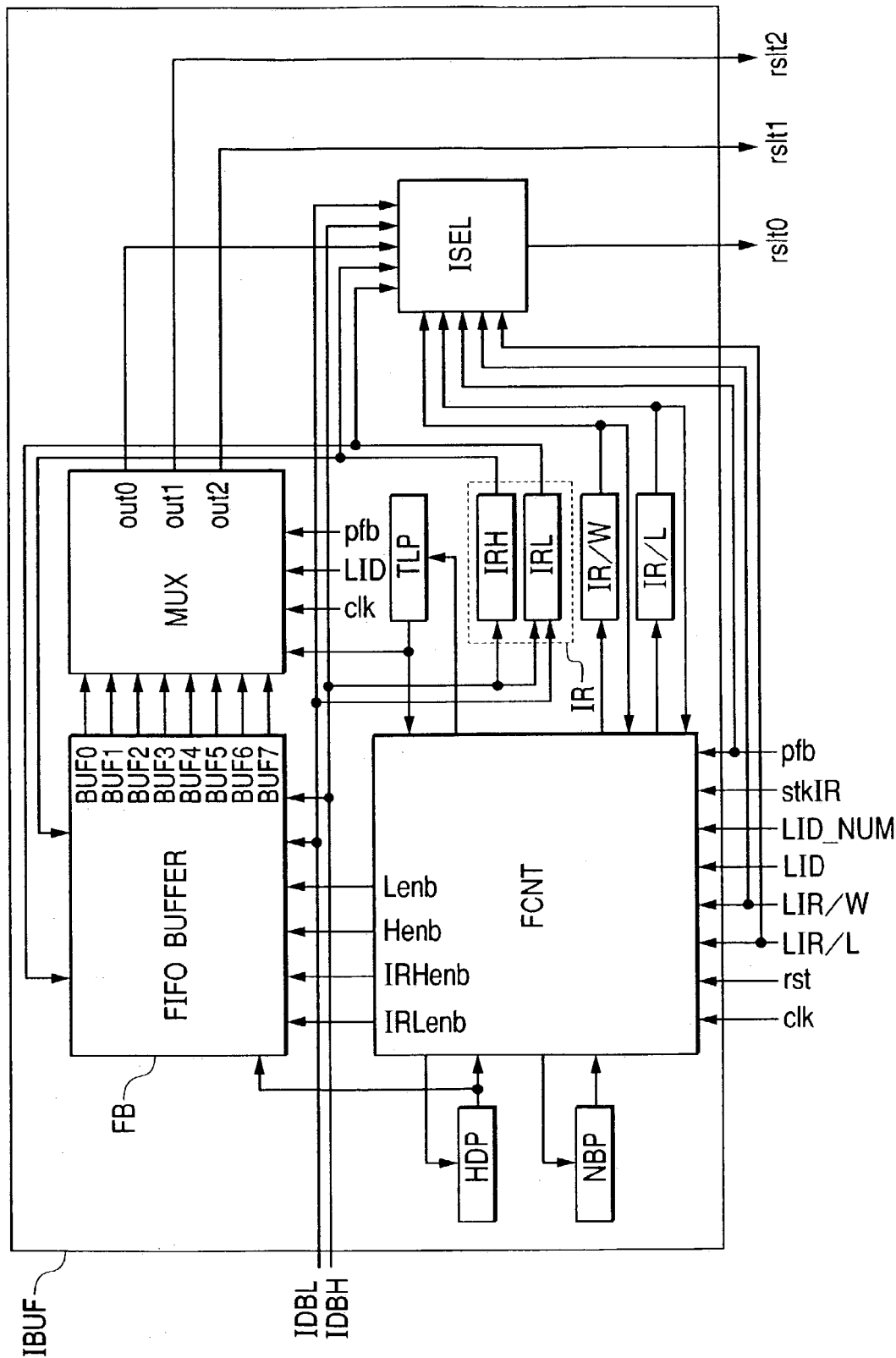
FIG. 13 is a block diagram presenting the details of an instruction buffer.

FIG. 13 presents the details of the instruction buffer IBUF. The instruction buffer IBUF includes a FIFO buffer FB serving as a first holding means that holds an instruction code, and an instruction register IR serving as a second holding means.

The instruction register IR is composed of a low-order instruction register IRL connected on an internal data bus IDBL and a high-order instruction register IRH connected on an internal data bus IDBH. A word enabling register IR/W indicates that the contents of the high-order instruction register IRH are valid. A long word enabling register IR/L indicates that the contents of both the high-order instruction register IRH and low-order instruction register IRL are valid.

The FIFO buffer FB includes eight stages of storage areas BUF0 to BUF7 in each of which 16-bit data is stored, though the FIFO buffer is not limited to this structure. In the storage areas BUF0 to BUF7, an instruction placed on an internal data bus IDB or an instruction read from the instruction register IR is saved. The internal data bus IDBH is used to transmit 16 high-order bits, while the internal data bus IDBL is used to transmit 16 low-order bits. TLP denotes a trailing bit pointer (read data pointer) of two bits long indicating a trailing storage area in which data is stored. HDP denotes a leading pointer (written data pointer) of two bits long indicating a leading storage area in which data is stored. NBP denotes a number-of-data items pointer indicating the number of data items stored in the FIFO buffer FB. A receiving route along which an instruction code is received and stored in a storage area is designated with a signal IRHenb, IRLenb, Henb, or Lenb. The signal IRHenb directs that an instruction code should be received from the high-order instruction register IRH. The signal IRLenb directs that an instruction code should be received from the low-order instruction register IRL. The signal Henb directs that an instruction code should be received over the internal data bus IDBH. The signal Lenb directs that an instruction code should be received over the internal data bus IDBL. A multiplexer MUX selects any of the outputs of the storage areas BUF0 to BUF7. The multiplexer MUX transmits data in the storage area indicated with the trailing pointer TLP through an output terminal out0, and transmits data in the storage area next to the storage area indicated with the trailing pointer TLP through an output terminal out1. The multiplexer MUX transmits data in the third storage area, which is a storage area adjoining the storage area next to the storage area indicated with the trailing pointer TLP, through an output terminal out2.

Any of the outputs received through the output terminal out0, received over the internal data buses IDBL and IDBH, or received from the instruction registers IRH and IRL which is selected by a selector ISEL. The selected output is transmitted as an output rslt0. The output rslt0 is transmitted to the instruction decoder DEC via a changing circuit CHG. The outputs transmitted through the output terminals out1 and out2 are used as outputs rslt1 and rslt2 to calculate an effective address or the like.

A buffer control circuit FCNT controls the entire instruction buffer IBUF. By the way, clk denotes a clock and rst denotes a Reset signal. LIR/W denotes a word length reading directing signal, LIR/L denotes a long word length reading directing signal, LID denotes an instruction execution completing signal, and LID_NUM denotes data representing the word length of an instruction whose execution is completed. Moreover, stkIR denotes a signal directing saving of an instruction on the internal data bus IDB into the instruction register IR. pfb (equivalent to clrFIFO) denotes a signal directing a branch. The signal stkIR is activated to logical 1 when a branch target instruction is placed on the internal data bus IDB during execution of a delay branch instruction. When the signal stkIR is activated, the buffer control circuit FCNT saves the instruction on the internal data bus IDB into the instruction register IR. Thereafter, when the signal pfb is activated, the FIFO buffer FB is cleared. The FIFO buffer EB is cleared by initializing the pointers TIP and HDP. The signals LIR/W, LIR/L, LID, LID_NUM, stkIR, and pfb are transmitted from the instruction decoder DEC.

In the instruction buffer IBUF, a branch target instruction read in response to a delay branch instruction is temporarily held in the register IR. After a delay slot instruction is terminated, the FIFO buffer FB is cleared. At this time, a branch address is held in a tentative register means, for example, a temporary register TR, and a count value of the prefetch counter pfc is preserved. When the length of an instruction code representing a delay slot instruction is large, instruction reading can be continued based on the count value of the prefetch counter pfc. The delay slot instruction may be executed in a plurality of execution states. Consequently, the number of instructions to be allocated to a delay slot increases, a delay branch is utilized effectively, user-friendliness improves, the use efficiency of resources improves, and fast processing is realized.

In an effort to conceal a latency derived from reading of a branch instruction during handling of a branch but not to suppress a disorder in pipelining, an instruction being executed in a plurality of execution states is allocated to a delay slot. This leads to a reduced number of execution states.

When an instruction allocated to a delay slot enters an execution state in which an instruction code representing the instruction is read or an execution state in which an effective address thereof is calculated, instruction reading is disabled. Thus, reading (pre-fetching) of an instruction that is not utilized is suppressed. Consequently, an increase in the number of execution states derived from insertion of a wait state can be avoided.

Figure 14:
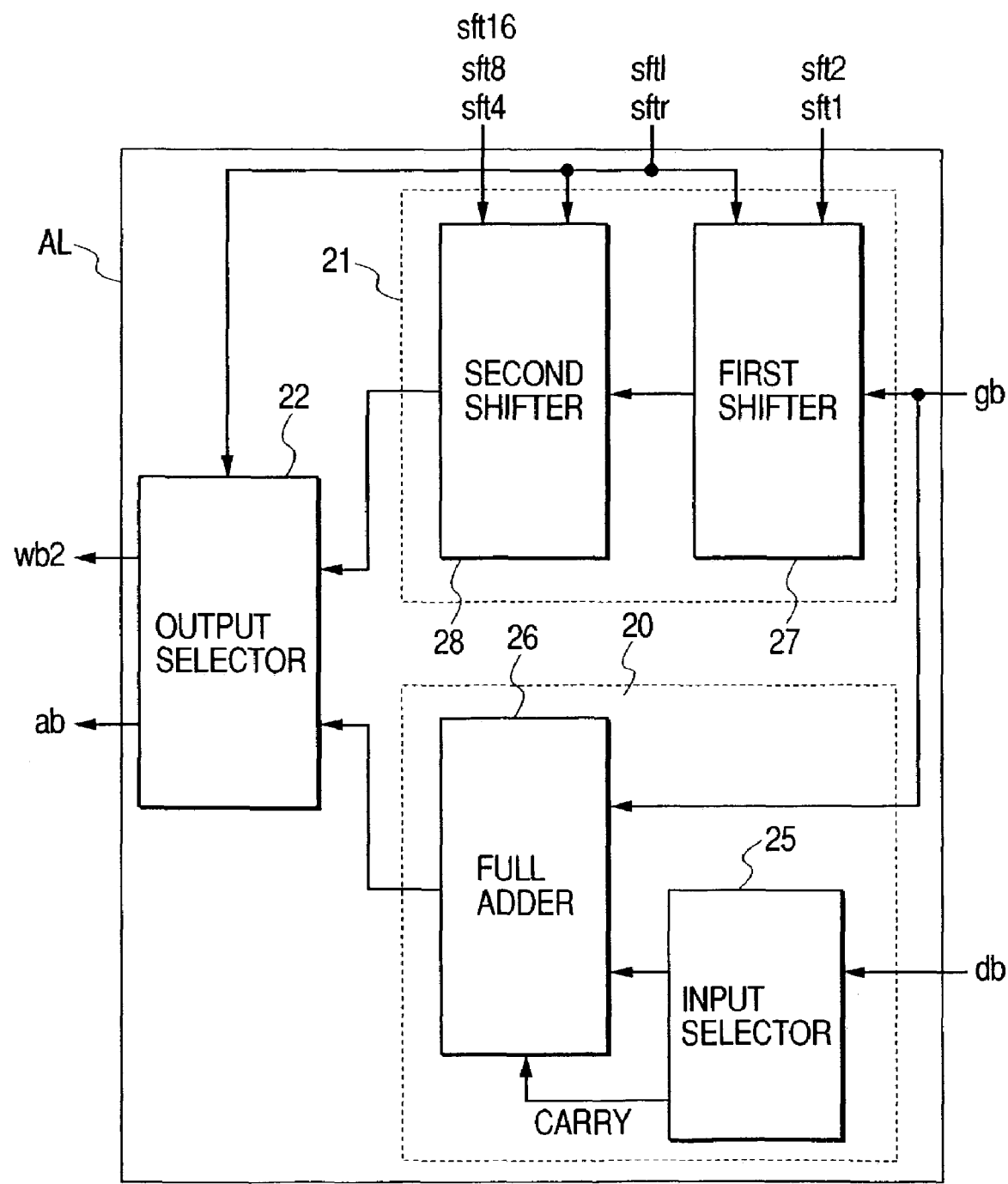
FIG. 14 is a block diagram presenting the details of an arithmetic and logic unit.

FIG. 14 presents the details of the arithmetic and logic unit ALU. FIG. 14 shows the arithmetic and logic unit 20, shifter 21, and output selector 22. Inclusion of a logic operation facility and an additional facility for producing a bit handling instruction or the like which are not shown will not be hindered.

The arithmetic and logic unit 20 has input terminals thereof connected on the internal buses gb and db. The shifter 21 has an input terminal thereof connected on the internal bus gb. The output selector 22 selects the result of an operation performed by the arithmetic and logic unit 20 or the result of an operation performed by the shifter 21. The output selector 22 places a selected result on an internal bus wb2, or if necessary, on an internal bus ab.

The arithmetic and logic unit 20 consists of an input selector 25 and a full adder 26. The input selector 25 reverses an input placed on the internal bus db and a carry. This is, as already known, intended to perform subtraction as addition of a complement of 2.

The shifter 21 comprises the first shifter 27 and second shifter 28, and receives a signal on the internal bus gb as well as control signals sft1, sftr, sft1, sft2, sft4, sft8, and sft16. The shifter 21 places the result of shifts on the internal bus wb2 via the output selector 22. The signal sft1 is a control signal directing a left shift, and the signal sftr is a control signal directing a right shift. The signal sft1 is a control signal directing a shift of one bit position, the signal sft2 is a control signal directing a shift of two bit positions, the signal sft4 is a control signal directing a shift of four bit positions, the signal sft8 is a control signal directing a shift of eight bit positions, and the signal sft16 is a control signal directing a shift of sixteen bit positions.

FIG. 15 presents the logical description of a control instruction that controls the first shifter 27. According to the logical description, when both the control signals sft1 and sft2 are inactive, no shift takes place. In other cases, a right or left shift of 1 or 2 bit positions is performed based on a combination of the control signals sft1, sftr, sft1, and sft2.

Likewise, FIG. 16 presents a logical description of a control instruction that controls the second shifter 28.

In the logical descriptions of the control instructions, which control the shifter 21, shown in FIG. 15 and FIG. 16, for example, 1 is specified for the control signal sft1, 1 is specified for stf1, 1 is specified for stf4, 0 is specified for sftr, and 0 is specified for sft2, 0 is specified for sft8, and 0 is specified for sft16. In this case, the first shifter 27 and second shifter 28 perform a left shift of five bit positions.

The foregoing logical descriptions define the actions of the control block so that the control block will not direct the first shifter 27 and second shifter 28 to perform a shift of a plurality of bit positions. Otherwise, priorities may be assigned to the logical descriptions of the control instructions that control the first shifter 27 and second shifter 28 respectively, and the logic of the control block may be defined based on the priorities.

Moreover, the logical descriptions of the control instructions that control a shifter may be defined without use of an operator << or the like. For example, a first case and a second case concerning the second shifter 28 may be described as presented in FIG. 17. The logical description may be modified in order to contain the description of an arithmetic shift or an operation of rotating bits right or left, or to change a byte count or a word length.

When either the control signal sft1 or control signal sftr is active, the output selector 22 selects an output of the shifter.

As far as the arithmetic and logic unit 20 is concerned, a carry is generated and one of two inputs that will undergo subtraction must be reversed. This leads to an increase in the number of logical operations. Even when the first shifter 27 and second shifter 28 are connected in series with each other, a delay caused by the shift operations will not get larger than a delay caused by arithmetic operations. An increase in a maximum operating frequency is hardly restricted. A barrel shifter requires selector circuits that select 64 right and left bit positions. In contrast, a selector circuit that selects any of five options may be adopted for the first shifter 27 included in the shifter 21, and a selector circuit that selects any of seven options may be adopted for the second shifter 28 therein. Herein, even a no-shift operation can be selected. Consequently, a logical scale can be drastically reduced.

Figure 18:
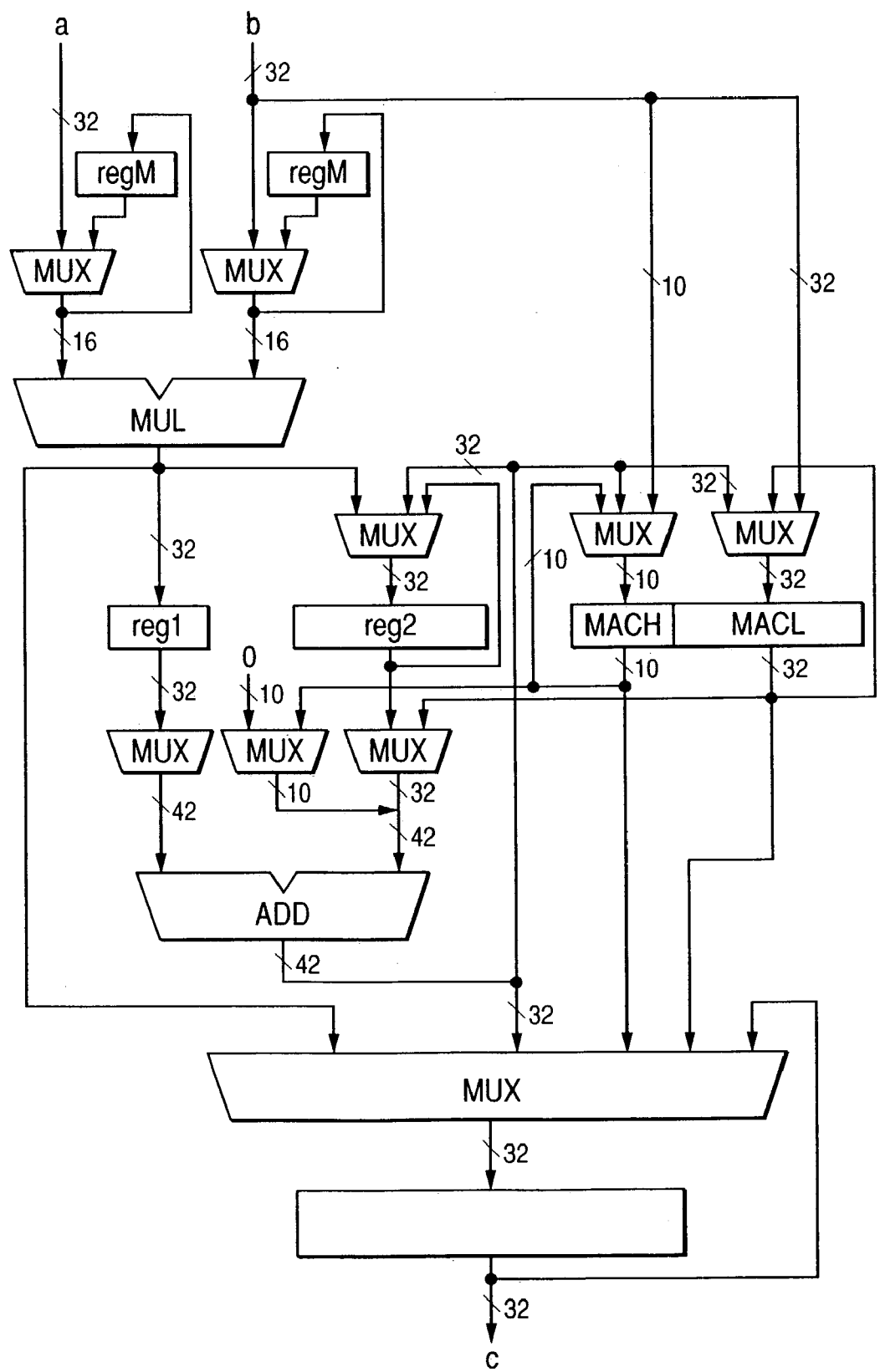
FIG. 18 is a block diagram presenting the details of a multiplier.

FIG. 18 presents the details of the multiplier MULT. MUL denotes a parallel multiplication circuit that performs an operation of multiplying 16 bits by 16 bits. reg1 and reg2 denote data registers in which a partial product is temporarily stored. ADD denotes an addition circuit. MAC (MACH or MACL) denotes a product summation circuit in which the results of multiplication are accumulated. regc denotes an output data register. MUX denotes a multiplexer. Data a is placed on an internal bus gb, data b is placed on an internal bus db, and data c is placed on an internal bus wb2. The multiplier MULT has its action of performing an operation controlled through state transition control. The state transition control logic whose illustration is omitted is implemented in the multiplier MULT.

Figure 19:
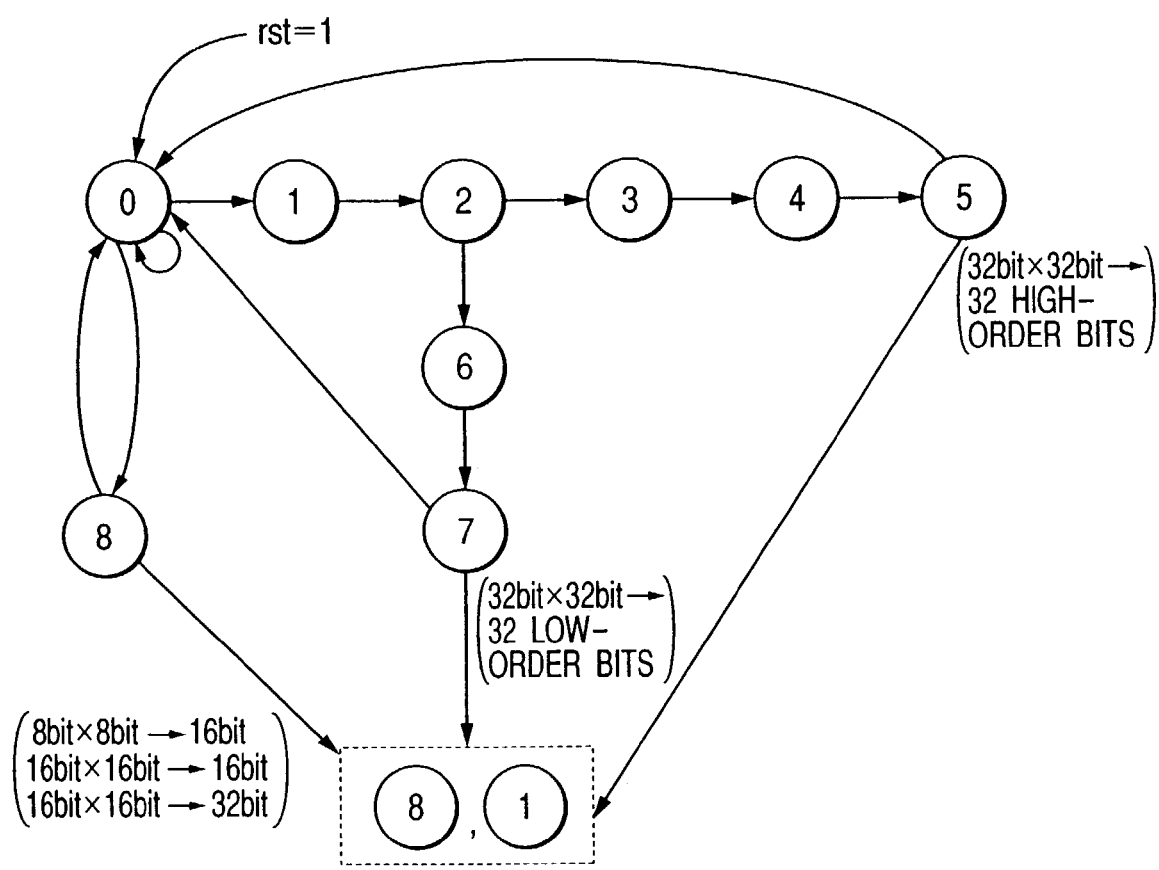
FIG. 19 shows a state transition made by the multiplier shown in FIG. 18 with multiplication controlled.

FIG. 19 presents a state transition to be made during the control of multiplication performed by the multiplier MULT shown in FIG. 18. States are specified as tmg=0 to tmg=8.

The state tmg=0 is a standby state (no-operation). But for an operation request issued from the control unit 2A, the multiplier MULT does not start an operation. The operation request is issued with the control signal start set to 1. As soon as the control signal start is set to 1, a signal that selects a kind of operation is activated. The state value is updated to a value associated with the kind of operation. The operation is then started. When the control signal mul_long is set to 1 indicating multiplication of 32 bits, the state tmg=0 is changed to the state tmg=1. Otherwise, the state tmg=0 is changed to the state tmg=8.

In the state tmg=1, an operation expression a[15:0]×b[15:0] is solved. The resultant data is stored in the register reg2. When the operation expression is signed, a control signal sign that is not shown is set to 1. When the operation expression is unsigned, the control signal sign is reset to 0. a[15:0] signifies 16 low-order bits of data a.

In the state tmg=2, an operation expression a[31:16]×b[15:0] is solved. The resultant data is stored in the register reg1. When the operation expression is signed, the control signal sign is set to 1. When the operation expression is unsigned, the control signal sign is reset to 0. When the 32 high-order bits of a product of 32 bits by 32 bits are needed, a control signal upper that is not shown is set to 1. When the 32 low-order bits of the product of 32 bits by 32 bits are needed, the control signal upper is reset to 0. If the control signal upper is set to 1, the next state is the state tmg=3. If the control signal upper is reset to 0, the next state is the state tmg=6.

In the state tmg=3, an operation expression {16'h0000, reg2[31:16]}+reg1 is solved. The resultant data is stored in the register reg2. An operation expression a[15:0]×b[31:16] is solved. The resultant data is stored in the register reg1. When the operation expression is signed, the control signal sign is set to 1. When the operation expression is unsigned, the control signal sign is reset to 0. The next state is the state tmg=4. {16'h0000, reg2[31:16]} signifies that 16 high-order bits are 0000 and the low-order bits constitute 32-bit data signified by reg2[31:16].

In the state tmg=4, an operation expression reg2+reg1 is solved. The resultant data is stored in the register reg2. An operation expression a[31:16]×b[31:16] is then solved, and the resultant data is stored in the register reg1. The next state is the state tmg=5. When the operation expression is signed, the control signal sign is set to 1. When the operation expression is unsigned, the control signal sign is reset to 0.

In the state tmg=5, when the control signal sign is set to 1, an operation expression {16{reg2[15]}, reg2[15:0]}+reg1 is solved, and the resultant data is stored in the register regc. When the control signal sign is reset to 0, an operation expression {16'h0000, reg2[15:0]}+reg1 is solved, and the resultant data is stored in the register regc. When the operation expression is signed, the control signal sign is set to 1. When the operation expression is unsigned, the control signal sign is reset to 0. When the control signal start is set to 1, the state value tmg is updated based on the state transition chart having the state tmg=0 as a reference state. The next operation is then executed. In the next state, the contents of the register regc are transmitted as the result of the operation through an output terminal c, and stored in a destination register. 16{reg2[15]} signifies data acquired by repeating reg2[15] 16 times for 16 bits.

In the state tmg=6, an operation expression reg2+{reg1[15:0], 16'h0000} is solved, and the resultant data is stored in the register reg2. An operation expression a[15:0]×b[31:16] is then solved, and the resultant data is stored in the register reg1. When the operation expression is signed, the control signal sign is set to 1. When the operation expression is unsigned, the control signal is reset to 0. The next state is the state tmg=7.

In the state tmg=7, an operation expression reg2+{reg1[15:0], 16'h0000} is solved, and the resultant data is stored in the register regc. When the control signal start is reset to 0, the next state is the state tmg=0. When the control signal start is set to 1, the state value tmg is updated based on the state transition chart having the state tmg=0 as a reference state. The next operation is then executed. In the next state, the result of the operation is transmitted through the output terminal c.

In the state tmg=8, an operation expression a[15:0]×b[15:0] is solved, and the resultant data is stored in the register regc. Moreover, an operation of working out 16 bits by multiplying 8 bits by 8 bits, an operation of working out 16 bits by multiplying 16 bits by 16 bits, and an operation of working out 32 bits by multiplying 16 bits by 16 bits are carried out. When the operation expression is signed, the control signal sign is set to 1. When the operation expression is unsigned, the control signal sign is reset to 0. When multiplication of 8 bits is performed, a control signal leg is set to 1. When multiplication of 16 bits is performed, the control signal leg is reset to 0. When the control signal start is reset to 0, the next state is the state tmg=0. When the control signal start is set to 1, the state value tmg is updated based on the state transition chart having the state tmg=0 as a reference state. An operation is then executed. In the next state, the result of the operation is stored in the register regc.

The multiplier MULT has its multiplying action controlled through state transition control described in conjunction with FIG. 19. The 32 high-order bits of the result of multiplication of 32 bits by 32 bits can be obtained by making a state transition in the order of the states tmg=1, tmg=2, tmg=3, tmg=4, tmg=5, and tmg=8. Moreover, the 32 low-order bits of the result of multiplication of 32 bits by 32 bits can be obtained by making the state transition in the order of the states tmg=1, tmg=2, tmg=6, tmg=7, and tmg=8. For example, the former is initiated with a multiplication instruction MULU.L, and the latter is initiated with a multiplication instruction MULU/UP.L. When the latter multiplication is used to work out the high-order bits of the result of multiplication of an inverse number, it substantially provides a result of division. Thus, fast division can be realized.

Incidentally, the states to be changed may include other states needed to realize other operations (summation of products or the like).

Figure 20:
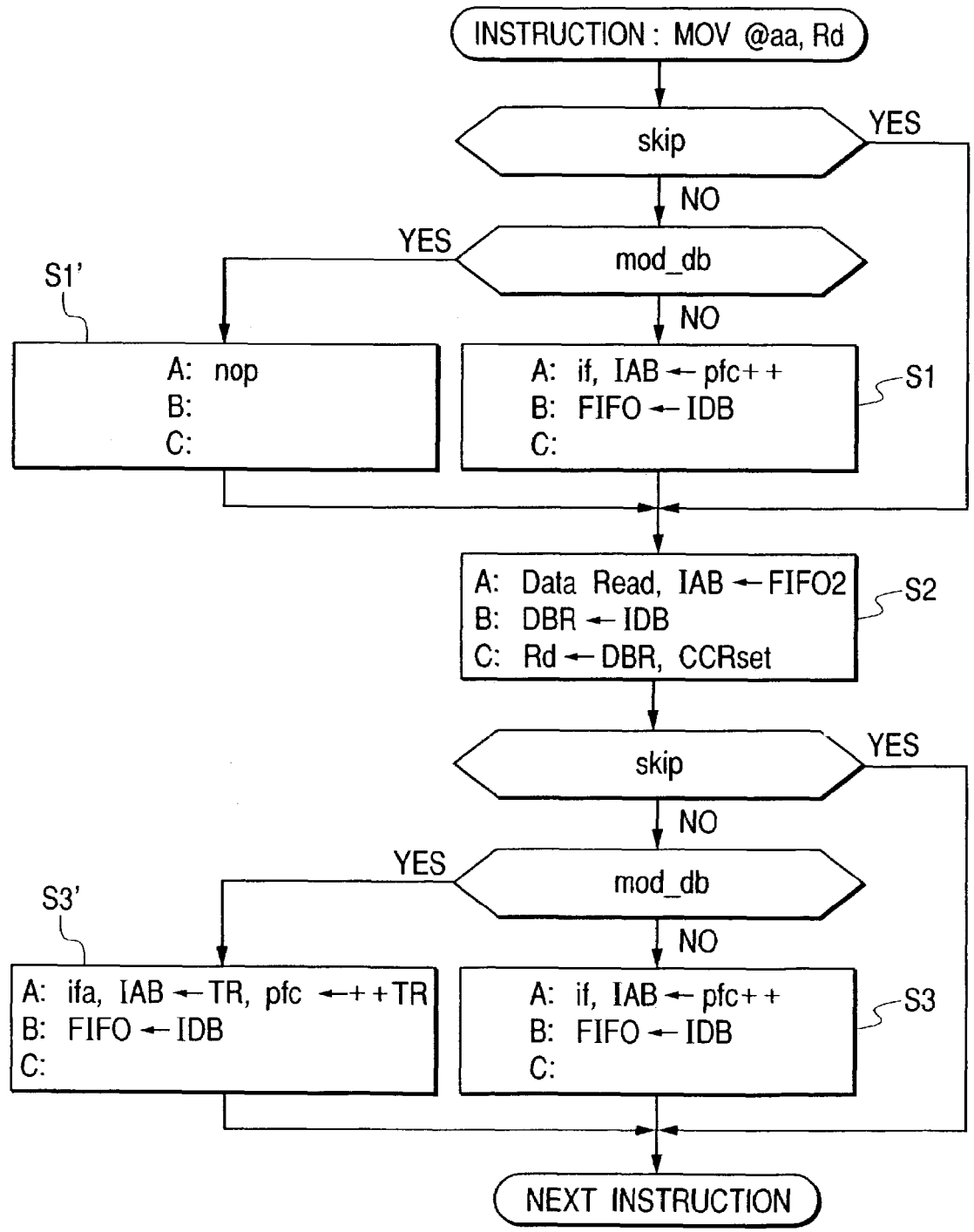
FIG. 20 is a flowchart showing an execution flow for a transfer instruction (MOV.W @aa:16,Rd) in relation to the state of an instruction buffer.
Figure 21:
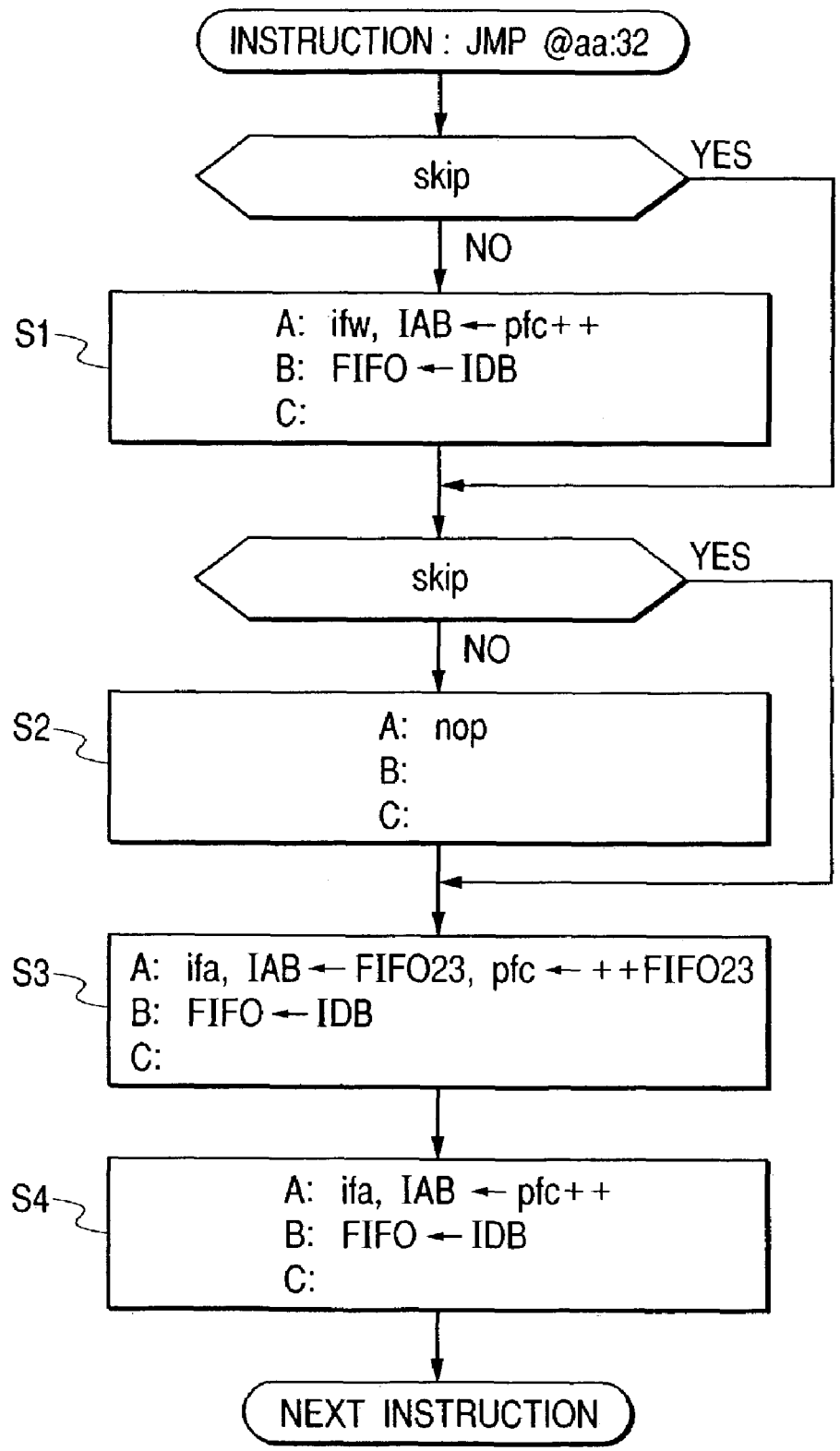
FIG. 21 is a flowchart showing an execution flow for a branch instruction (JMP @aa:32) in relation to the state of the instruction buffer.
Figure 22:
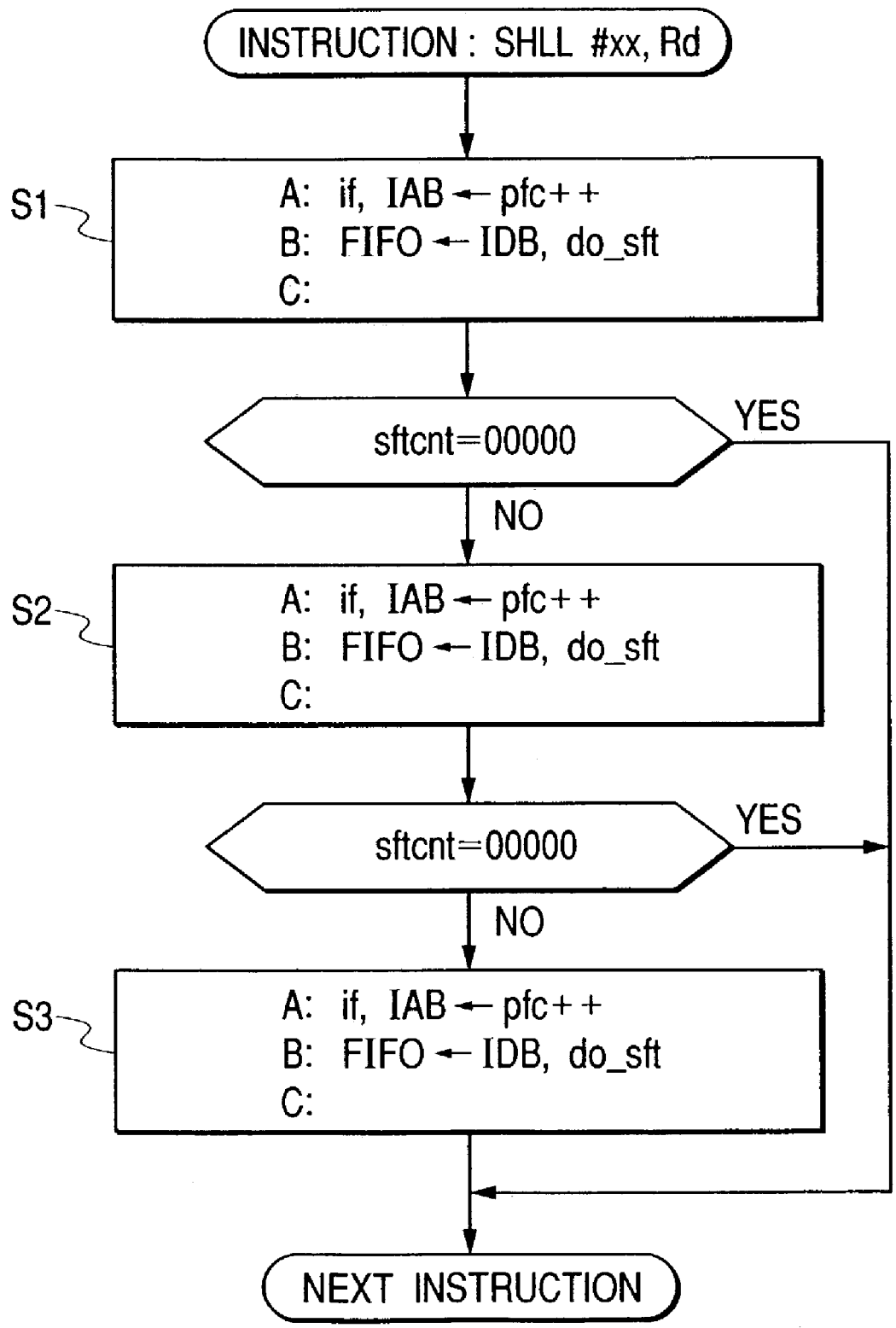
FIG. 22 is a flowchart showing an execution flow for a plurality-of-bit shifts instruction (SHLL #xx,Rd) in relation to the state of the instruction buffer.

FIG. 20 to FIG. 22 are flowcharts showing instruction execution in relation to the state of the instruction buffer IBUF. The contents of control presented in the flowcharts may be understood to be equivalent to the contents of control extended by the instruction decoder DEC.

Referring to FIG. 20, the instruction execution sequence will be described by taking a transfer instruction (MOV.W @aa:16,Rd) for instance. In the flowchart, whether an instruction is skipped is verified by verifying whether the FIFO buffer FB is full. "Yes" signifies that the result of verification demonstrates that the FIFO buffer FB is full. Verification of whether the modification signal mod_db is received corresponds to verification of whether it is now a delay slot period. "Yes" signifies that the result of the verification demonstrates that it is now the delay slot. When the FIFO buffer is full, if it is now the delay slot, instruction fetch is not performed.

When the transfer instruction enters a first state (S1), reading of the next instruction (if) and increment of the prefetch counter pfc are performed in response to a control signal A. In response to a control signal B, the read instruction is stored in the instruction buffer IFIFO.

If the read instruction is executed as a delay slot instruction (mod_db=yes), no operation is performed in the first state thereof (S1') of the transfer instruction. This is because even if instruction prefetch is executed, the resultant instruction is not utilized.

When the transfer instruction enters a second state (S2), the EA extension field (aa) of the transfer instruction is interpreted according to a different code through code extension on the basis of an output rslt1 of the instruction buffer IBUF in response to the control signal A. The interpreted data is placed on the internal address bus IAB by way of the internal bus ab and address buffer AB. At the same time, a bus command is issued in order to read data. In response to the control signal B, the data read in the second state of the transfer instruction is stored in the read data buffer DBR over the internal data bus IDB in a third state of the transfer instruction. Furthermore, with a control signal C, the data is transferred from the read data buffer DBR to the general-purpose registers over the internal bus wb2 in the next state of the transfer instruction. Moreover, data is tested, and the result of the test is held in the flag register CCR.

When the transfer instruction enters the third state (S3), reading (if) of an instruction succeeding the next instruction and increment of the prefetch counter pfc are performed in response to the control signal A. In response to the control signal B, the read instruction is stored in the instruction buffer IBUF.

When the instruction is executed as a delay slot instruction (mod_db=yes), the contents of the temporary register TR are read instead of the contents of the prefetch counter pfc in the third state (S3') of the transfer instruction. Moreover, an instruction reading request (ifa) is issued irrespective of the number of bits remaining in the FIFO buffer FB.

The first state and third state of the transfer instruction are omitted (skipped) depending on the number of read bits of the transfer instruction (saved in the FIFO buffer). If the number of read bits is small, the actions defined to be performed in the first and third states are carried out. An instruction longer than the transfer instruction (two words) is then read. If the number of read bits is appropriate, the action defined to be performed in one of the first and third states is carried out. An instruction having the same length as the transfer instruction (of two words long) is then read. If the number of read bits is large, the actions defined to be performed in the first and third states are not carried out. No instruction is therefore read.

To be more specific, if the number of bits remaining in the instruction buffer at the start of execution of the transfer instruction, delta, has a relationship of delta>num relative to the data length num of an instruction code representing the transfer instruction, the first state of the transfer instruction is omitted. This is because the transfer instruction including its EA extension field has already been read and is immediately executable. Besides, the next instruction is made available in consideration of the latency derived from instruction reading. Moreover, if delta-num>2 is established, the third state of the transfer instruction is omitted. This is because the first word of the next instruction has already been read, and execution of the instruction can be started. Moreover, even if the next instruction is terminated in the first state, another word is made available in consideration of a latency derived from instruction reading.

As mentioned above, in the first state S1 of the transfer instruction, reading of the transfer instruction (if) and increment of the prefetch counter pfc are disabled for fear the instruction buffer may overflow. This action is shared with the previous instructions, and the definition of the action is omitted from the description of each instruction. Instruction reading (ifa) does not depend on the number of bits remaining in the FIFO buffer FB and is therefore not disabled.

FIG. 21 presents an execution sequence of a branch instruction (JMP @aa:32). When the branch instruction enters a first state (S1), reading of the next instruction (ifw) and increment of the prefetch counter pfc are performed in response to a control signal A. In response to a control signal B, the read instruction is stored in the instruction buffer IBUF.

When the branch instruction enters a second state (S2), storage of the read instruction in the instruction buffer IBUF is waited.

When the branch instruction enters a third state, the EA extension field (aa) of the branch instruction is placed on the internal address bus IAB over the internal bus ab via the address buffer AB on the basis of the outputs rslt1 and rslt2 of the instruction buffer IBUF in response to the control signal A. The contents of the EA extension field are incremented by the incrementer INC and saved in the prefetch counter pfc. At the same time, a bus command is issued in order to execute instruction reading. In response to the control signal B, the read instruction is stored in the instruction buffer IBUF.

When the branch instruction enters a fourth state, reading of an instruction succeeding the next instruction (if) and increment of the prefetch counter pfc are performed in response to the control signal A. In response to the control signal B, the read instruction is stored in the instruction buffer IBUF.

The first and second states of the branch instruction are omitted (skipped) depending on the number of read bits of the branch instruction (saved in the FIFO buffer FB).

If the number of bits remaining in the instruction buffer at the start of execution of the branch instruction, delta, has a relationship of delta≧num relative to the number of bits num representing the branch instruction, the first and second states of the branch instruction are omitted. This is because the branch instruction including the EA extension field thereof has already been read and can be immediately executed. Moreover, when consideration is taken into the number of bits constituting an instruction code representing an instruction being read, ifnum, if delta+ifnum≧num is established, the first state of the branch instruction is omitted. This is because the branch instruction has already been read, and can be executed one state later. It is therefore unnecessary to additionally perform instruction reading.

When the action supposed to be performed in the first execution state of the branch instruction is carried out, since at least the first and second words of the branch instruction have been read according to the previous instruction, only one word is short. When a program is transferred over a 16-bit bus, an instruction should be read in units of a word. If a request for instruction reading in units of 32 bits is issued, an unnecessary word is also waited. Thus, a wait state is inserted. Therefore, the control signal ifw is activated in order to forcibly perform instruction reading in units of a word.

FIG. 22 presents an execution sequence of a plurality-of-bit shifts instruction (SHLL #xx,Rd). In the first to third execution states of the plurality-of-bit shifts instruction, reading of an instruction (if) and increment of the prefetch counter pfc are performed in response to a control signal A. In response to a control signal B, the read instruction is stored in the instruction buffer IBUF. Further, in response to a control signal B, the shifter 21 performs an operation. This action is specified as do_shift. More particularly, the contents of the designated destination register Rd are read and placed on the internal bus gb in response to a control signal rdgb[n], and transmitted to the shifter 21. The control signals sft1, sftr, sft1, sft2, sft4, sft8, and sft16 are issued in order to initiate shift operations. In response to a control signal wbrd[n], the results of the shift operations are stored in the destination register Rd. A predetermined flag is set in the condition code register CCR. A control signal sftcnt is then produced.

As mentioned above, when all the bits of the control signal sftcnt are 0s, the plurality-of-bit shifts instruction is verified to be terminated. When all the bits of the control signal sftcnt are not 0s, insertion of an interrupt is disabled (an interrupt directing signal intrq produced by the interrupt control section INTC shown in FIG. 1 is not treated). This action is defined to be performed in up to three states of the plurality-of-bit shifts instruction. Thus, up to 31 bit positions is arbitrarily shifted.

As mentioned above, instruction reading (if) and increment of the prefetch counter pfc are disabled appropriately for fear the instruction buffer may overflow. This action is shared with the preceding instructions. Therefore, the description of the action is omitted from the description of each instruction.

Figure 23:
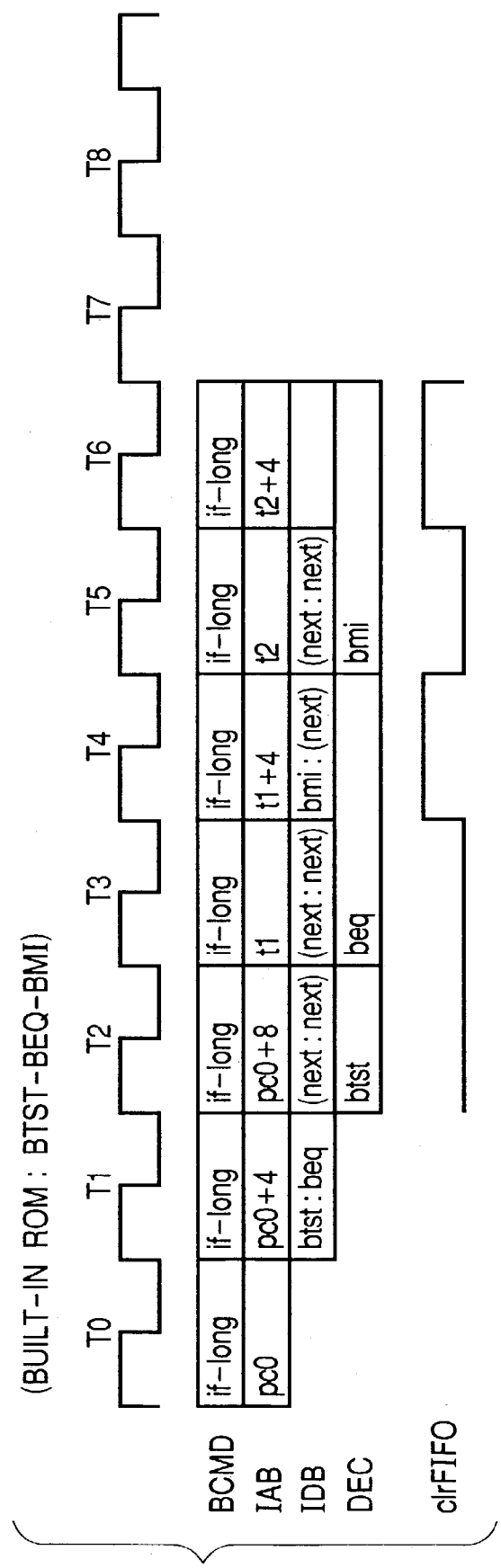
FIG. 23 is a timing chart showing the timings of executing instructions in a built-in ROM.
Figure 24:
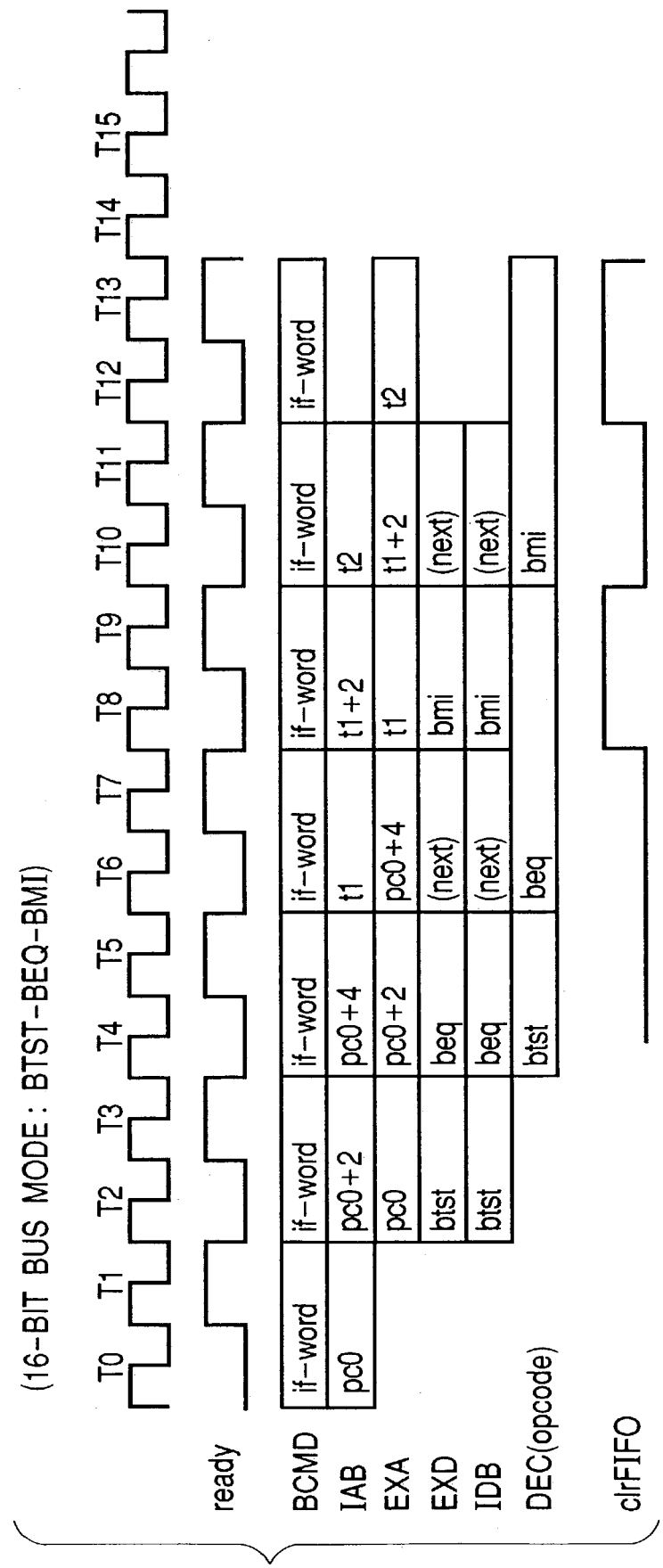
FIG. 24 is a timing chart showing the action timings of executing instructions fetched from an external memory in 16-bit bus mode.
Figure 25:
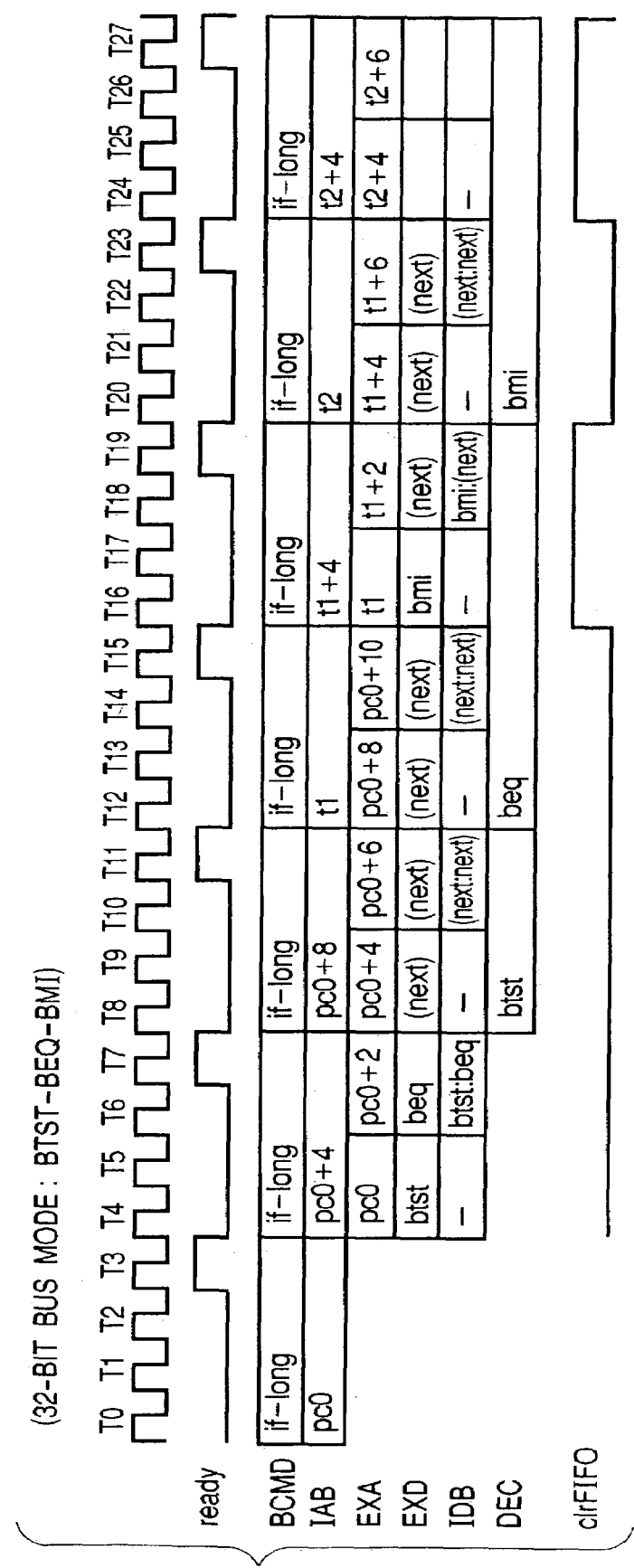
FIG. 25 is a timing chart showing the action timings of executing instructions fetched from the external memory in 32-bit bus mode.

FIG. 23 to FIG. 25 present the instruction execution timings in different bus modes. The timing charts are concerned with a case where a program briefed below is executed for a branch target designated in a branch instruction.

```
pc0  BTST #6, R0L
     BEQ t1
     . . .
t1   BMI t2
     . . .
```

The branch conditions inherent to respective conditional branch instructions BEQ and BMI shall be satisfied. An external memory is connected on a 16-bit bus, and accessible over two state periods. Incidentally, the Ready signal ready is a response signal returned from the bus controller relative to a request for instruction reading or data reading or writing (bus command) issued from the CPU. The Ready signal serves as an enabling signal that enables the CPU to make a state transition.

FIG. 23 shows execution timings in the built-in ROM. This is concerned with a case where instructions BTST (bit handling instruction), BEQ (conditional branch instruction), and BMI (conditional branch instruction) are fetched from the built-in ROM and executed.

At the timing T0, an immediately preceding branch instruction is executed, and an address is therefore read from the address buffer AB incorporated in the CPU 2 and placed on the internal address bus IAB. Moreover, the instruction decoder DEC issues a bus command BCMD, which directs instruction fetch (if-long) to be performed on an instruction of a long word length. if-long corresponds to 'longread.

At the timing T1, reading is executed based on the address signal placed on the bus IAB at the timing T0 and the bus command BCMD issued at the timing T0. Consequently, read data of a long word long is placed on the internal data bus IDB. At the timing T2, the instruction decoder DEC receives a preceding word (instruction BTST) of the read data and interprets the instruction. A succeeding word (instruction BEQ) is stored in the FIFO buffer FB included in the instruction buffer IBUF.

Based on the result of the interpretation, a given control signal is produced and the instruction BTST is executed. The details will be omitted. At the timing T2, an instruction of a long word long is fetched.

On the other hand, at the timing T2, reading is executed based on the address signal placed on the bus IAB at the timing T1 and the bus command BCMD issued at the timing T1. Read data of a long word length is placed on the internal data bus IDB. At the timing T3, the instruction decoder DEC receives the next instruction (instruction BEQ) from the instruction buffer IBUF, and interprets the instruction.

Based on the result of the interpretation, an effective address is calculated. At the timings T3 and T4, an instruction of a long word length is fetched from a branch target (t1, t1+4).

Likewise, at the timing T5, the instruction decoder DEC receives data (instruction BMI) read based on the address signal placed on the bus IAB at the timing T3 and the bus command BCMD issued at the timing T3, and interprets the instruction. Based on the result of the interpretation, an effective address is calculated. At the timings T5 and T6, an instruction of a long word length is fetched from a branch target (t2, t2+4).

FIG. 24 presents actions of executing instructions fetched from an external memory in 16-bit bus mode. Over the timings T0 to T1, an immediately preceding branch instruction is executed. Consequently, an address signal is read from the address buffer AB included in the CPU 2 and placed on the internal address bus IAB. Moreover, the instruction decoder DEC issues a bus command BCMD that directs information fetch of a word length (if-word). if-word corresponds to 'wordread.

Over the timings T2 to T3, reading is performed on the external buses (EXA and EXD) according to the address signal placed on the bus IAB over the timings T0 to T1 and the bus command BCMD issued over the timings T0 to T1. Read data is placed on the internal data bus IDB. At the timing T4, the instruction decoder DEC receives the read data (instruction BTST) and interprets the instruction.

Based on the result of the instruction, a given control signal is produced, and the instruction BTST is executed.

The details will be omitted. Over the timing T4 to T5, an information of a word length is fetched.

On the other hand, over the timings T4 to T5, reading is performed on the external buses (EXA and EXD) according to the address signal placed on the bus IAB over the timings T2 to T3 and a bus command BCMD issued over the timings T2 to T3. Read data is placed on the internal bus IDB. At the timing T6, the instruction decoder DEC receives the read data (instruction BEQ) and interprets the instruction.

Based on the result of the interpretation, an effective address is calculated. Over the timings T6 to T7 and the timings T8 to T9, an instruction of a word length is fetched from a branch target (t1, t1+2). Likewise, over the timings T8 to T9, the instruction decoder DEC receives data (instruction BMI) read based on the address signal placed on the bus IAB over the timings T6 and T7 and the bus command BCMD issued over the timings T6 and T7. The instruction is interpreted. Based on the result of the interpretation, an effective address is calculated. Over the timings T10 to T11 and at the timings T12 to T13, an instruction of a word length is fetched from a branch target (t2, t2+2).

As apparent from FIG. 24, although a clock frequency is lower than the one) attained in the built-in ROM as shown in FIG. 23, since the 16-bit bus mode is adopted, the number of bus cycles is the same as that shown in FIG. 23.

FIG. 25 presents actions of executing instructions fetched from an external memory in 32-bit bus mode. Over the timings T0 to T3, an immediately preceding branch instruction is executed, and an address read from the address buffer AB incorporated in the CPU 2 is placed on the address bus IAB. Moreover, the instruction decoder DEC issues a bus command (BCMD) that directs fetching (if-long) of an instruction of a long word long.

Over the timings T4 to T7, reading based on the address signal placed on the bus IAB over the timings T0 to T3 and the bus command BCMD issued over the timings T0 to T3 is performed on the external buses (EXA and EXD) as two times of reading of an instruction of a word long. Over the timings T6 to T7, the read data of a long word long is placed on the internal data bus IDB. At the timing T8, the instruction decoder DEC receives a preceding word (instruction BTST) of the read data, and interprets the instruction. A succeeding word (instruction BEQ) is stored in-the FIFO buffer FB included in the instruction buffer IBUF. Based on the result of the interpretation, a given control signal is produced and the instruction BTST is executed. The details will be omitted. Over the timings T8 to T11, an instruction of a long word long is fetched.

On the other hand, over the timings T8 to T11, reading based on the address signal placed on the internal address bus IAB over the timings T4 to T7 and the bus command BCMD issued over the timings T4 to T7 is performed on the external buses (EXA and EXD) as two readings of words. Over the timings T10 to T11, read data of a long word long is placed on the internal data bus IDB. At the timing T12, the instruction decoder DEC receives the next instruction (instruction BEQ) read from the instruction buffer IBUF and interprets the instruction. Based on the result of the interpretation, an effective address is calculated. Over the timings T12 to T15 and the timings T16 to T19, an instruction of a long word long is fetched from a branch target (t1, t1+4)

Likewise, over the timings T18 to T19, reading is performed based on the address signal placed on the bus IAB over the timings T12 to T15 and the bus command BCMD issued over the timings T12 to T15. At the timing T20, the instruction decoder DEC receives the read data (instruction BMI) and interprets the instruction. Based on the result of the interpretation, an effective address is calculated. Over the timings T20 to T23 and the timings T24 to T27, an instruction of a long word long is fetched from a branch target (t2, t2+4).

In 32-bit bus mode, unlike 16-bit bus mode, instructions fetched during five times of word reading performed on the external buses over the timings T10 to T15 or the timings T20 to T23 are unused and wasted. Consequently, the number of execution states increases. If execution of the program is not preceded by execution of a branch instruction, instruction reading may be disabled depending on the number of bits remaining in the instruction buffer. Therefore, the bus command issued over the timings T4 to T5 may be disabled (NOP: no-operation), and word reading may not be performed on the external buses over the timings T12 to T15. Consequently, the instructions may be completed in one execution state. Moreover, when a branch condition for the instruction BEQ or BMI is not satisfied, a branch does not take place. In this case, if an interrupt is not requested, an instruction code that is read is used but not wasted.

Figure 26:
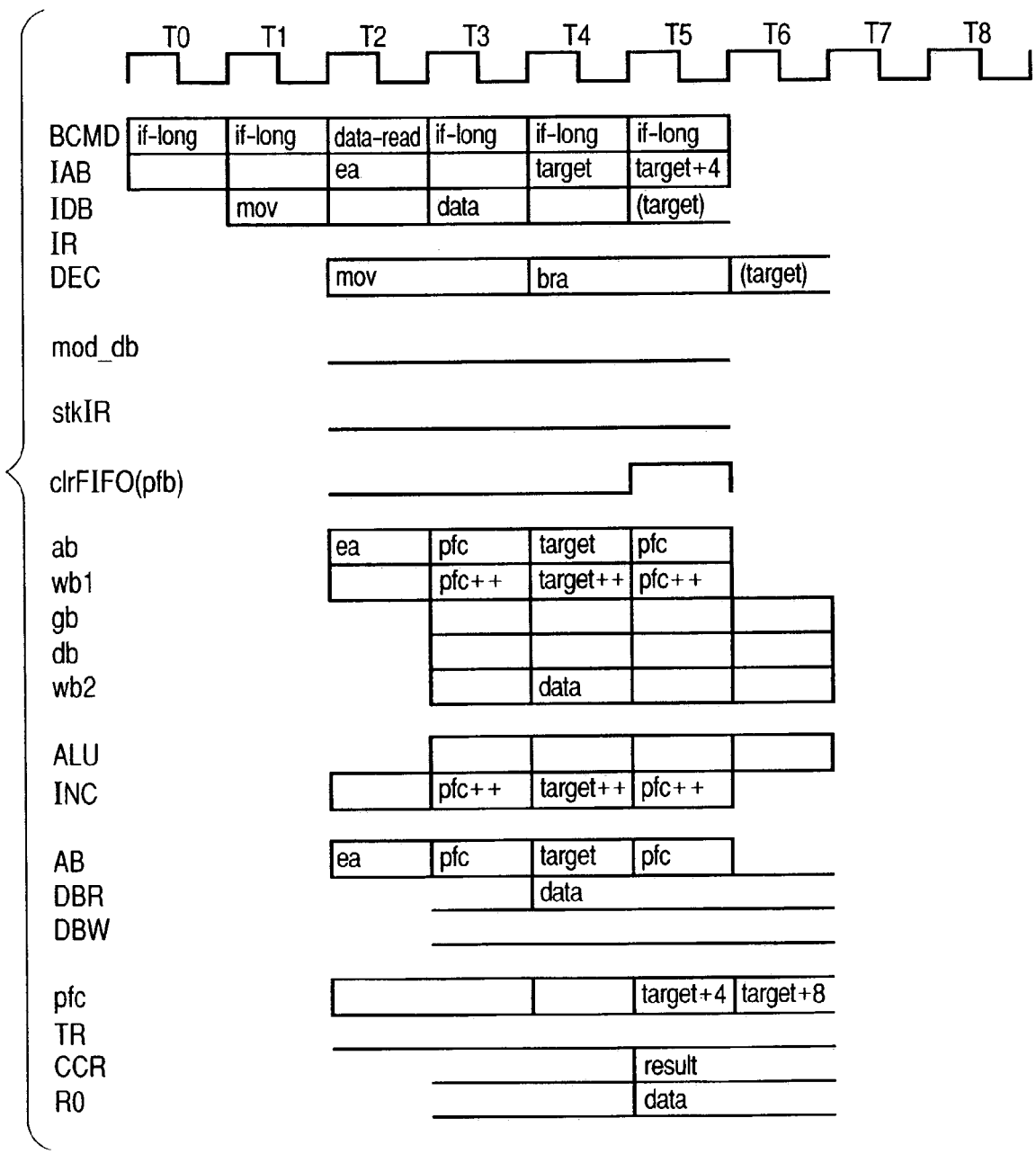
FIG. 26 is a timing chart showing a first example of the timing of executing a normal branch instruction.

FIG. 26 shows a first example of execution timings for a normal branch instruction and others. Herein, the normal branch instruction is a branch instruction that is not a delay branch instruction. A program taken as an example will be briefed below.

MOV.W @ER1, R0
BRA target
. . .
target

As mentioned above, at the timing T2, the instruction decoder DEC receives an instruction MOV and interprets the instruction. Based on the result of the interpretation, the contents of the general-purpose register ER1 are placed as an effective address on the internal address bus IAB. A bus command (data-read) that directs word reading is issued. At the same time, a data reading control signal containing a register selection signal is produced. Actions started at the timings T3 and T4 are controlled sequentially. Specifically, fetching into the read data buffer DBR is directed at the timing T3. Transfer of the contents of the read data buffer DBR to the destination register R0 is directed at the timing T5.

Read data is placed on the internal data bus IDB at the timing T3. As mentioned above, the read data is fetched into the read data buffer DBR at the timing T4, and transferred to the general-purpose register R0 at the timing T5. At the same time, a predetermined flag in the condition code register CCR is updated based on the transferred data. Moreover, instruction reading is performed at the timing T4. The count value of the prefetch counter pfc is placed on the internal address bus IAB, and incremented by the incrementer INC.

At the timing T4, the instruction decoder DEC receives an instruction BRA and interprets the instruction. Based on the result of the interpretation, an effective address is calculated. At the timing T4, an instruction of a long word long (a word when a value specified in target is not a multiple of 4) is fetched from a branch target (target). The branch target address is incremented by the incrementer INC, and saved in the prefetch counter pfc. At the timing T5, a control signal clrFIFO (equivalent to the control signal pfb) is activated and the FIFO buffer FB is initialized. Moreover, an instruction at a branch target is transmitted to the instruction decoder DEC.

Figure 27:
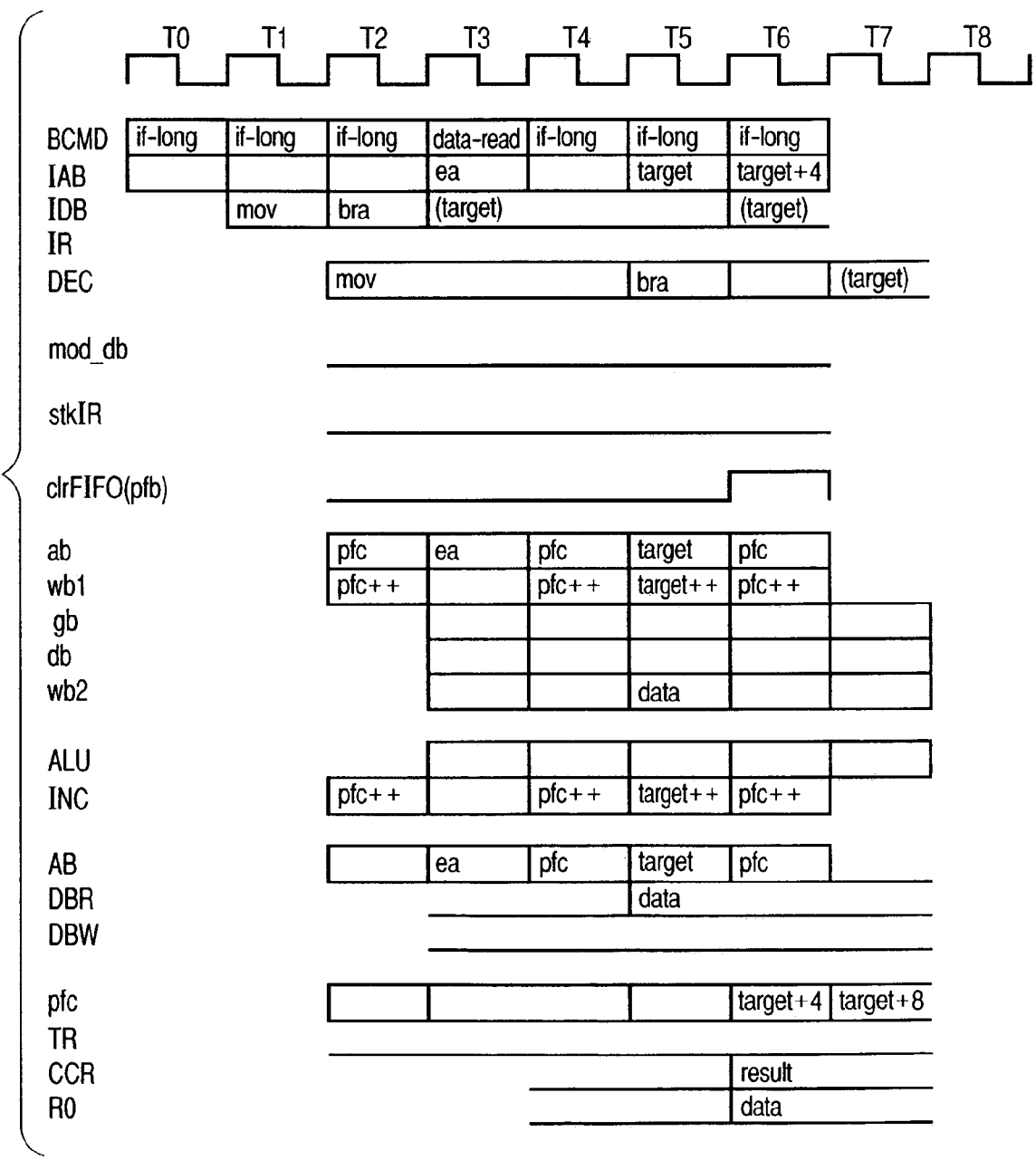
FIG. 27 is a timing chart showing a second example of the timing of executing the normal branch instruction.

FIG. 27 shows a second example of execution timings for a normal branch instruction and others. A program taken as an example will be briefed below.

```
            MOV.W   @aa:16, R0
            BRA     target
            . . .
   target
```

As mentioned above, at the timing T2, the instruction decoder DEC receives an instruction MOV and interprets the instruction. Based on the result of the interpretation, instruction reading is executed in the first state of the instruction MOV (S1 in FIG. 20) that starts at the timing T2. Reception of the EA extension field of the instruction MOV is waited. In the second state of the instruction MOV that starts at the timing T3, the EA extension field (aa) of the instruction MOV is transmitted from the instruction buffer IBUF through an output terminal out1, and interpreted according to a different code through code extension. The resultant data is transmitted as an effective address from the address buffer AB onto the internal address bus IAB. Moreover, a bus command (data-read) that directs word reading is issued. At the same time, a data reading control signal containing a register selection signal is produced, and actions to be performed over the timings T4 and T5 are controlled sequentially. Specifically, fetching into the read data buffer DBR is directed at the timing T4. Transfer of the contents of the read data buffer DBR into the destination register R0 is directed at the timing T5.

Read data is placed on the internal data bus IDB at the timing T4, and, as mentioned above, fetched into the read data buffer DBR at the timing T5. The data is then transferred to the register R0 at the timing T6. At the same time, a predetermined flag in the condition code register CCR is updated based on the transferred data. Moreover, instruction reading is performed at the timing T4.

The instruction decoder DEC receives an instruction BRA at the timing T5, and interprets the instruction. Based on the result of the interpretation, an instruction of a long word long is fetched from a branch target (target) at the timing T5. The branch target address is incremented by the incrementer INC and saved in the prefetch counter pfc. At the timing T6, a control signal clrFIFO (equivalent to the signal pfb) is activated and the FIFO buffer FB is initialized. Moreover, an instruction read from a branch target and saved in the instruction register IR is transmitted to the instruction decoder DEC.

Figure 28:
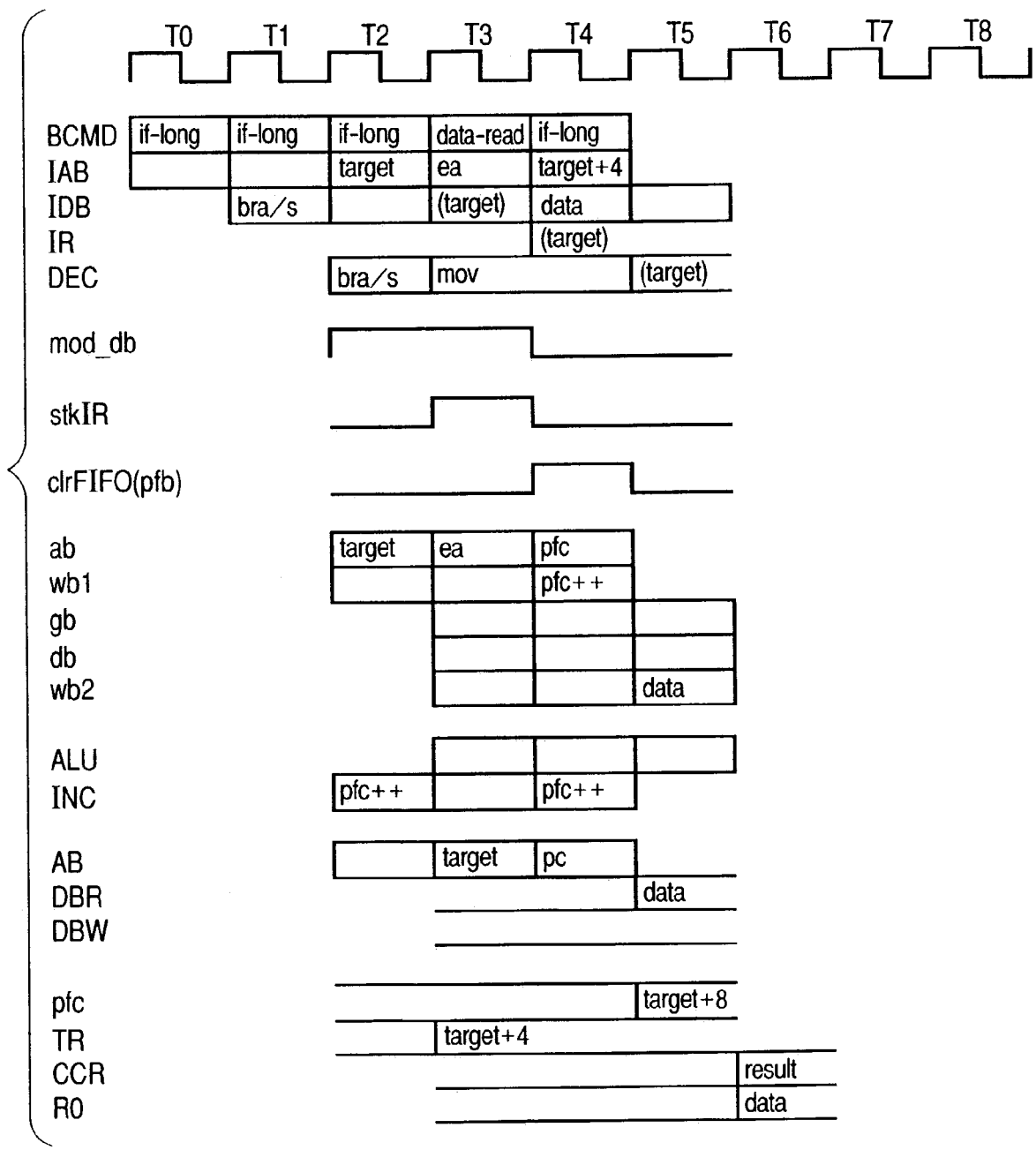
FIG. 28 is a timing chart showing a first example of the timing of executing a delay branch instruction.

FIG. 28 shows a first example of execution timings for a delay branch instruction and others. A program taken as an example will be briefed below.

```
            BRA/S   target
            MOV.W   @ER1, R0
            . . .
   target
```

Processing is substantially identical to the one achieved by the program described in FIG. 26. BRA/S denotes a branch instruction accompanied by a delay slot instruction, that is, a delay branch instruction.

At the timing T2, the instruction decoder DEC receives a delay branch instruction (BRA/S) and interprets the instruction. Based on the result of the interpretation, an effective address is calculated. At the timing T3, an instruction of a long word long (a word when the address of the branch target is not a multiple of 4) is fetched from a branch target (target). The branch target address is incremented by the incrementer INC, and saved in the temporarily register TR. Moreover, a control signal mod_db (indicating that the instruction is a delay slot instruction) is transmitted in order to modify a delay slot instruction. At the timing T3, the instruction decoder DEC receives the delay slot instruction (in this case, instruction MOV) and interprets the instruction. Based on the result of the instruction, the contents of the general-purpose register ER1 are placed as an effective address on the internal address bus IAB. A bus command (data-read) that directs word reading is issued. At the same time, a data reading control signal containing a register selection signal is produced. Based on the control signal, actions to be performed at the timings T4 and T5 are controlled. Specifically, fetching data into the read data buffer DBR is directed at the timing T4. At the timing T5, transfer of the contents of the read data buffer DBR into the destination register R0 is directed.

Read data is placed on the internal data bus IDB at the timing T4, fetched into the read data buffer DBR at the timing T5, and transferred to the register R0 at the timing T6. At the same time, a predetermined flag in the condition code register CCR is updated based on the transferred data.

Moreover, instruction reading is executed at the timing T4. At this time, the delay slot instruction is modified based on the control signal mod_db. Thus, the contents of the temporary register TR are used instead of the contents of the prefetch counter pfc. The address read from the temporary register TR is incremented by the incrementer INC and saved in the prefetch counter pfc. Moreover, a control signal stkIR is activated at the timing T3, and an instruction fetched from a branch target is stored in the register IR included in the instruction buffer IBUF. At the timing T4, a control signal clrFIFO (equivalent to a signal pfb) is activated and the FIFO buffer FB is initialized. The instruction fetched from the branch target and stored in the instruction register IR is transmitted to the instruction decoder DEC.

By combining a delay branch instruction and a delay slot instruction, a latency derived from instruction reading from a branch target is concealed and a delay branch instruction is executed in one execution state. Actions supposed to be performed in the first states of the instruction BRA and instruction BRA/S respectively are basically identical to each other. A difference between the actions lies in whether an output of the incrementer INC is saved in the prefetch counter pfc or in the temporary register TR.

Figure 29:
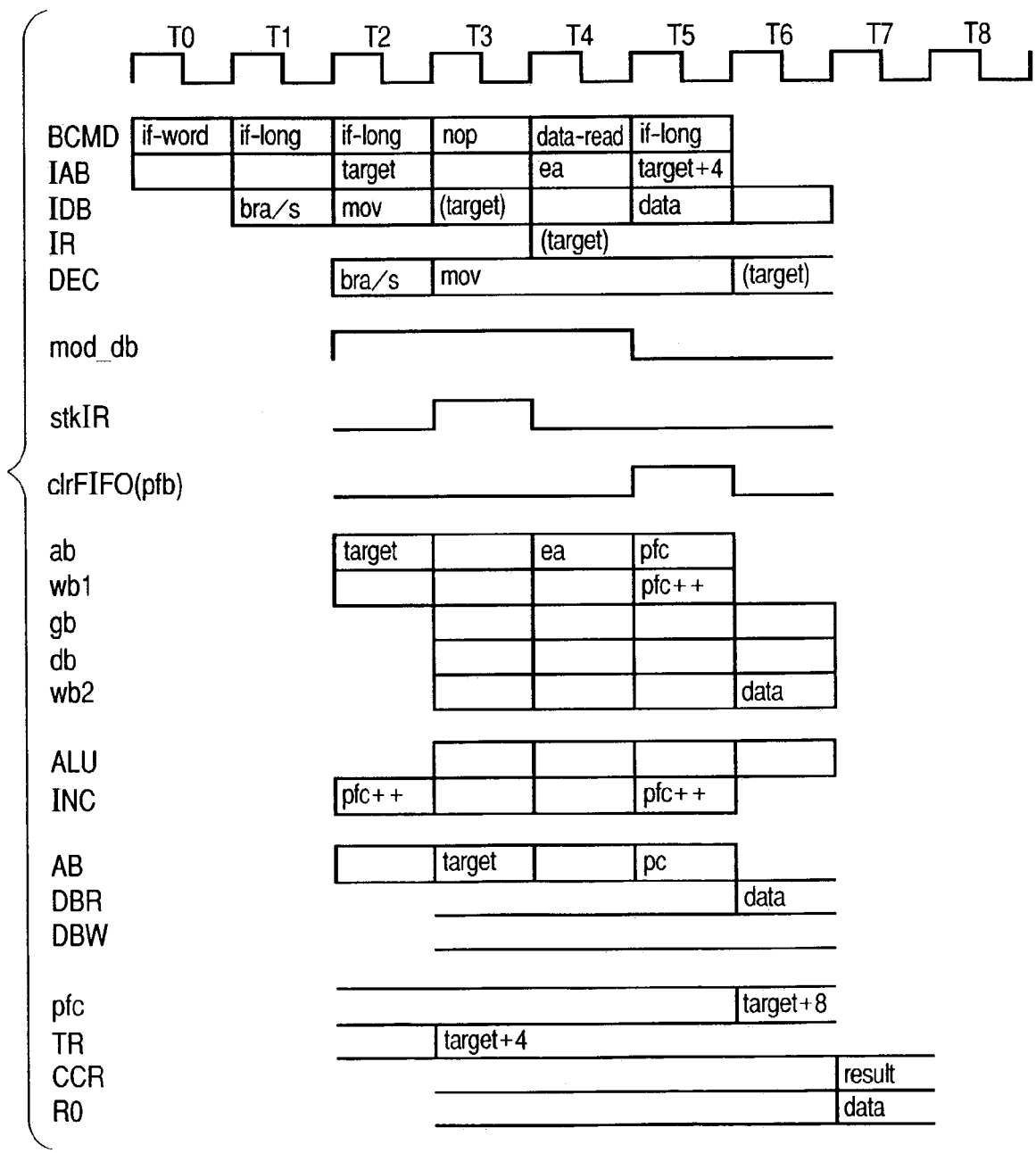
FIG. 29 is a timing chart showing a second example of the timing of executing the delay branch instruction.

FIG. 29 shows a second example of execution timings for a delay branch instruction and others. A program to be presented as an example will be briefed below.

```
            BRA/S   target
            MOV.W   @aa:16, R0
            . . .
   target
```

Processing performed by the program is substantially identical to that performed by the program described in FIG. 27.

At the timing T2, the instruction decoder DEC receives a delay branch instruction (instruction BRA/S) and interprets the instruction. Based on the result of the interpretation, an instruction of a long word long is fetched from a branch target (target) at the timing T3. The branch target address is incremented by the incrementer INC, and saved in the temporary register TR. Moreover, a control signal mod_db is transmitted in order to modify a delay slot instruction. The information decoder DEC receives the delay slot instruction (instruction MOV) and interprets the instruction. The delay slot instruction is modified based on the result of the interpretation and the control signal mod_db. In the first state of the delay slot instruction (S1 in FIG. 20) that starts at the timing T4, instruction reading is not performed, but reception of the EA extension field of the delay slot instruction is waited. In short, the EA extension field whose reading has already started is transferred to the FIFO buffer FB. In the second state of the delay slot instruction that starts at the timing T4, the EA extension field (aa) of the delay slot instruction is transmitted from the instruction buffer IBUF through an output terminal out1. The EA extension field is interpreted according to a different code through code extension, and transmitted as an effective address from the address buffer AF over the internal address bus IAB. Furthermore, a bus command BCMD (data-read) that directs word reading is issued. At the same time, a data reading control signal containing a register selection signal is produced, and actions supposed to be performed at the timings T5 and T6 are controlled based on the control signal. Specifically, fetching into the read data buffer DBR is directed at the timing T5, and transfer of the contents of the read data buffer DBR to the destination register R0 is directed at the timing T6.

Read data is placed on the internal data bus IDB at the timing T5, and, as mentioned above, fetched into the read data buffer DBR at the timing T6. At the timing T7, the data is transferred to the register R0. At the same time, a predetermined flag in the condition code register CCR is updated based on the transferred data.

Moreover, instruction reading is executed at the timing T5. At this time, when the delay slot instruction is modified based on the control signal mod_db, the contents of the temporary register TR are used instead of the count value of the prefetch counter pfc. The address represented by the contents of the temporary register is incremented by the incrementer INC and saved in the prefetch counter pfc.

Moreover, a control signal stkIR is activated at the timing T3, and an instruction at a branch target is stored in the instruction register IR included in the instruction buffer IBUF. At the timing T5, a control signal clrFIFO (equivalent to a signal pfb) is activated and the FIFO buffer FB is initialized. The instruction fetched from the branch target and stored in the instruction register IR is transmitted to the instruction decoder DEC. The FIFO buffer FB is initialized at the timing T6. Therefore, during execution of the delay slot instruction, for example, the EA extension field (ea) may be transmitted from the FIFO buffer FB at the timing T4 and put to use.

Instruction reading supposed to be performed in the first state (S1) of the instruction MOV is disabled, and wasting instruction reading is avoided.

Figure 30:
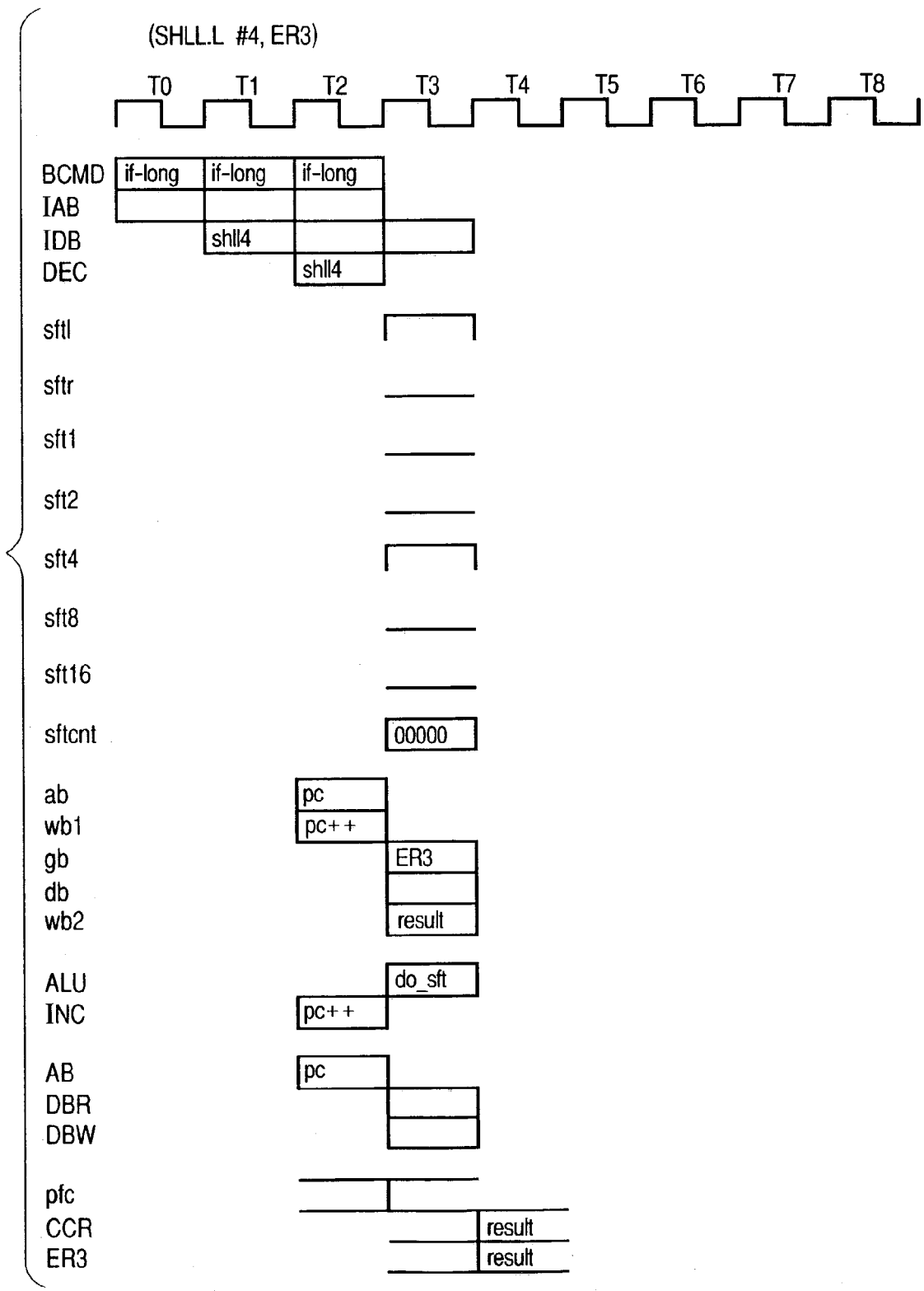
FIG. 30 is a timing chart showing a first example of the timing of executing a shift instruction.

FIG. 30 shows a first example of execution timings for a shift instruction. Herein, the execution timings for executing instruction SHLL #4,ER3 will be illustrated. The instruction directs a left shift of 4 bit positions.

At the timing T2, the instruction decoder DEC receives an instruction code (shll4) and interprets the instruction. Based on the result of the interpretation, the contents of the destination register ER3 are placed on the internal bus gb at the timing T3, and transmitted to the arithmetic and logic unit ALU. Control signals sft1 and sft4 are activated. The first shifter 27 does not perform a shift but the second shifter 28 performs a shift operation of four bit positions. The result of the shift operation is placed on the internal bus wb2. At the same time, the contents of the internal bus wb2 are stored in the general-purpose register ER3 that is a destination register. Moreover, the result of the shift is verified in order to update a predetermined bit in the condition code register CCR. For example, if the result of the operation is such that all bits are zeros, a Z flag is set to 1. Moreover, the data placed on the internal bus gp[28] and subjected to shift-out is saved as a C flag. The details of instruction reading will be omitted.

Figure 31:
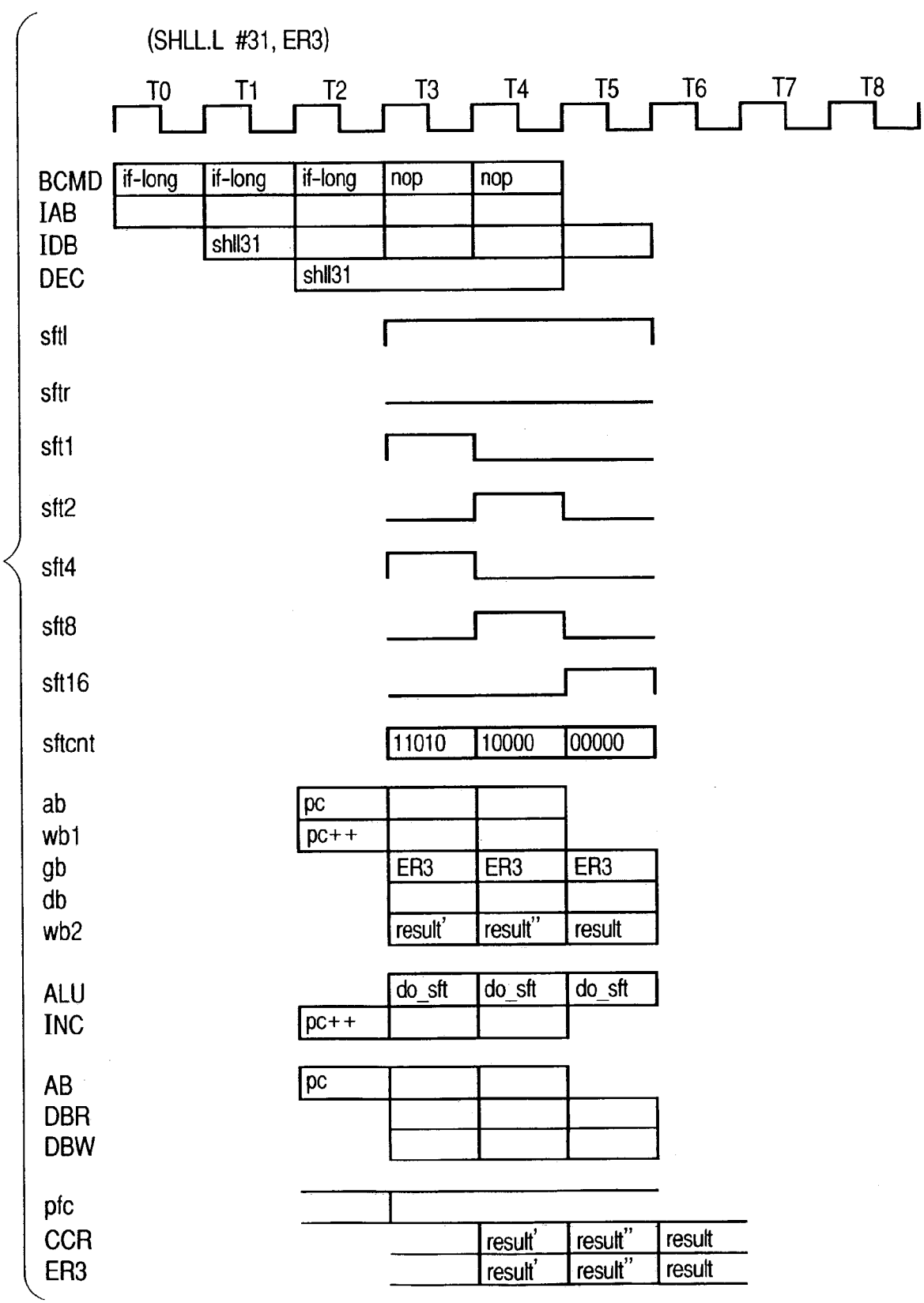
FIG. 31 is a timing chart showing a second example of the timing of executing the shift instruction.

FIG. 31 shows a second example of execution timings for a shift instruction. Herein, the execution timings for instruction SHLL #31, ER3 are illustrated. The instruction directs a left shift of 31 bit positions.

At the timing T2, the instruction decoder DEC receives an instruction code (shll31) and interprets the instruction. Based on the result of the interpretation, the contents of the destination register ER3 are placed on the internal bus gb and transferred to the arithmetic and logic unit ALU over the timings T3 to T5. At the timing T3, control signals sft1 (directing a left shift), sft1 (directing a shift of one bit position), sft4 (directing a shift of four bit positions) are activated. The first shifter 27 performs a shift operation of one bit position, and the second shifter 28 performs a shift operation of four bit positions (a left shift of five bit positions in total). The results of the shift operations (intermediate results result') are placed on the internal bus wb2. At the same time, the data on the internal bus wb2 is stored in the general-purpose register ER3 that is a destination register. Moreover, the results of the shifts are verified, and a predetermined bit in the condition code register CCR is updated.

At the timing T4, the control signals sft1 (left shift), sft2 (shift of two bit positions), and sft8 (shift of eight bit positions) are activated. The first shifter 27 performs a shift operation of two bit positions, and the second shifter 28 performs a shift operation of eight bit positions (a left shift of 15 bit positions in total over the timings T3 and T4). The results of the shift operations (intermediate result result") are placed on the internal bus wb2. At the same time, the data on the internal bus wb2 is stored in the general-purpose register ER3 that is the destination register. Moreover, the results of the shifts are verified, and a predetermined bit in the condition code register CCR is updated.

At the timing T5, the control signals sft1 (left shift) and sft16 (shift of 16 bit positions) are activated. The first shifter 27 does not perform a shift, but the second shifter 28 performs a shift operation of 16 bit positions (a left shift of 31 bit positions in total over the timings T3 to T4). The results of the shift operations (result) are placed on the internal bus wb2. At the same time, the data on the internal bus wb2 is stored in the general-purpose register ER3 that is the destination register. Moreover, the final results of the shift operations are verified, and a predetermined bit in the condition code register CCR is updated. Instruction reading supposed to be performed over the timings T3 and T4 is illustrated to be disabled because of the number of bits remaining in the FIFO buffer FB.

Figure 32:
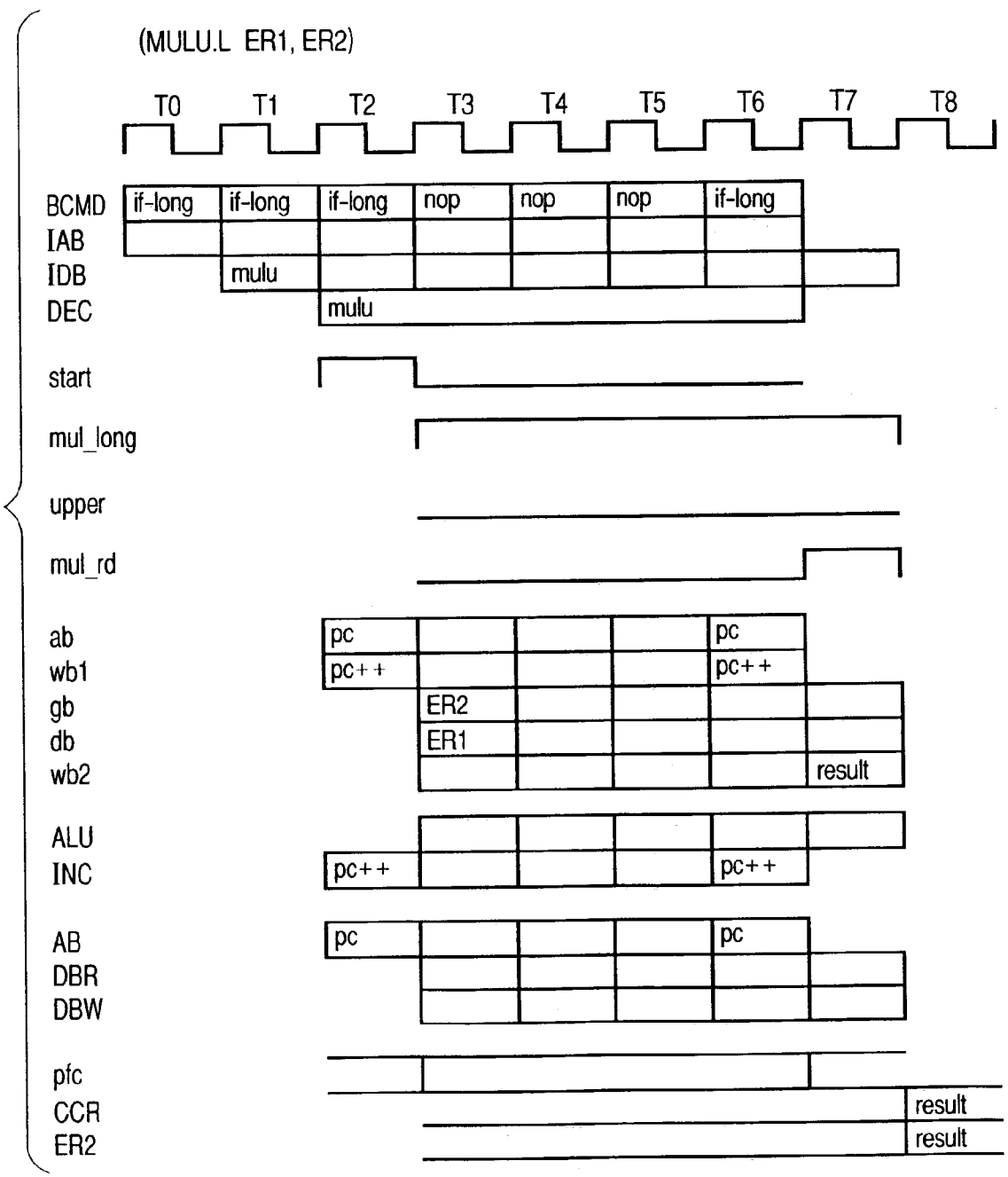
FIG. 32 is a timing chart showing a first example of the timing of executing a multiplication instruction.

FIG. 32 shows a first example of execution timings for a multiplication instruction. Herein, the execution timings for instruction MULU.L ER1, ER2 are illustrated. The instruction directs the processing of acquiring 32 low-order bits of a product of 32 bits by 32 bits.

At the timing T2, the instruction decoder DEC receives an instruction code (mulu), and interprets the instruction. Based on the result of the interpretation, a Start signal start is transmitted to the multiplier MULT at the timing T2. The multiplier MULT starts changing states. At the timing T3, the contents of the source register ER1 are placed on the internal bus db, and the contents of the destination register ER2 are placed on the internal bus gb. The contents are transferred to the multiplier MULT. Over the timings T3 to T5, a control signal mul_long is activated in order to signify multiplication of 32 bits by 32 bits. The multiplier MULT is controlled based on the control signal mul_long. At the timing T7, the result of multiplication is placed on the internal bus wb2 according to a control signal mul_rd. Moreover, at the timing T8, the data on the internal bus wb2 is stored in the general-purpose register ER2 that is the destination register. Moreover, the result of the multiplication is verified in order to update a predetermined bit in the condition code register CCR.

Figure 33:
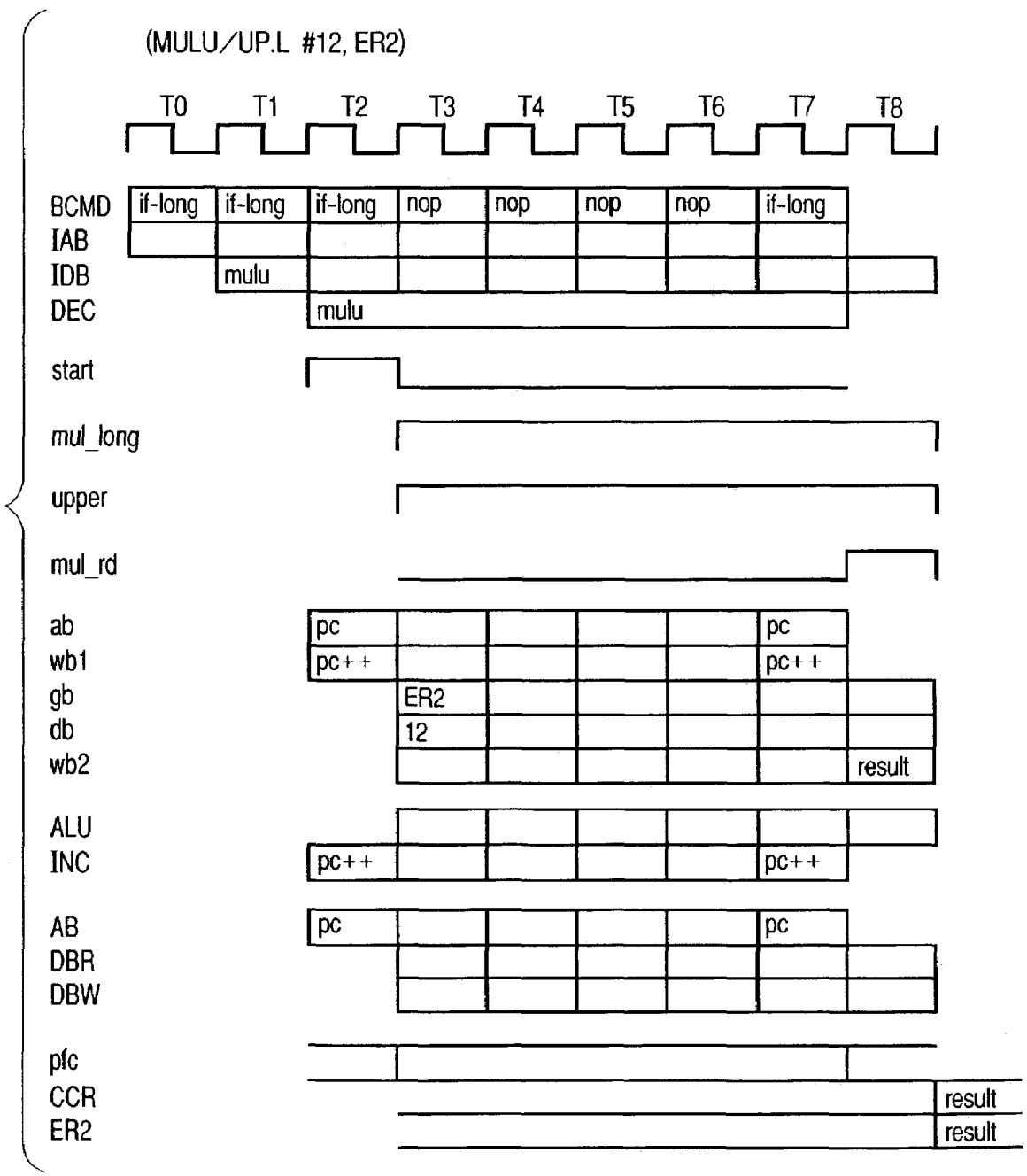
FIG. 33 is a timing chart showing a second example of the timing of executing the multiplication instruction.

FIG. 33 shows a second example of execution timings for a multiplication instruction. Herein, the execution timings for instruction MULU/UP. L #12, ER2 are illustrated. The instruction directs the processing of acquiring the 32 high-order bits of a product of 32 bits by 32 bits.

At the timing T2, the instruction decoder DEC receives an instruction code (mulu), and interprets the instruction. Based on the result of the interpretation, a Start signal start is transmitted to the multiplier MULT at the timing T2. The multiplication MULT starts changing states. At the timing T3, immediate data (12) is extended with zeros and placed on the internal bus db. The contents of the destination register ER2 are placed on the internal bus gb, and transferred to the multiplier MULT. Over the timings T3 to T8, a control signal mul_long is activated in order to signify multiplication of 32 bits by 32 bits. A control signal upper that signifies acquisition of high-order bits is activated. The multiplier MULT is thus controlled.

At the timing T8, the result of the multiplication is placed on the internal bus wb2 according to a control signal mul_rd. At the timing T9, the data on the internal bus wb2 is stored in the general-purpose register ER2 that is a destination register. Moreover, the result of the multiplication is verified in order to update a predetermined bit in the condition code register CCR.

Figure 34:
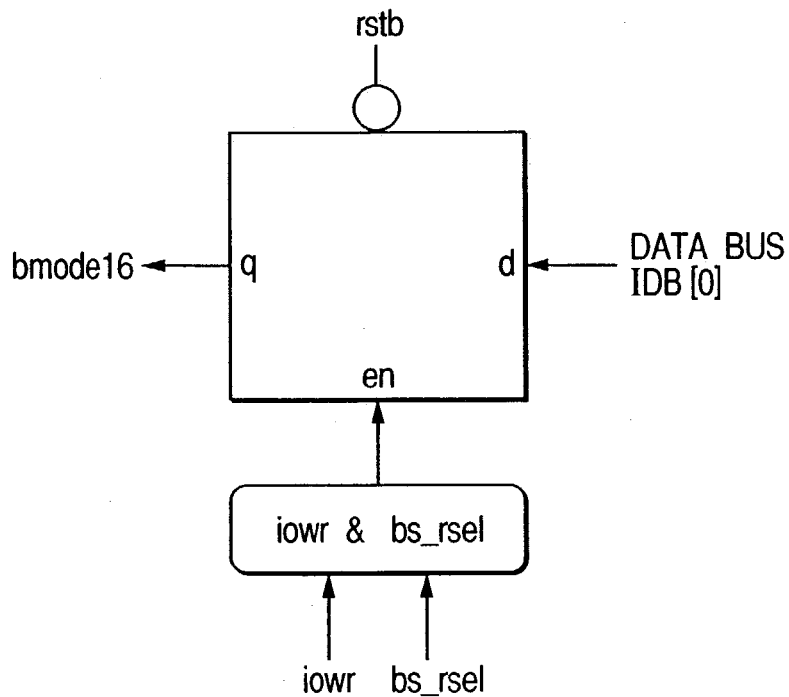
FIG. 34 is a block diagram presenting a configuration for producing a control bit bmod.

FIG. 34 presents a configuration for producing the control bit bmode16. The control bit bmode16 is produced by a flip-flop FFbc, and initialized in a reset state (attained responsively to a signal rstb=0 whose trailing b signifies that the signal is a reverse signal of a reset signal rst). The AND (iowr&bs_rsel) of a Write signal iowr that directs writing of an internal I/O register and a selection signal bs_rsel that designates an internal I/O register containing the control bit bmode16 is adopted as an enabling signal. A bit at a predetermined bit position on the data bus IDB, for example, bit at bit position 0 is received. The flip-flop FFbc is incorporated in the bus controller 3. The flip-flop FF shown in FIG. 1 receives an output of the flip-flop FFbc.

Figure 35:
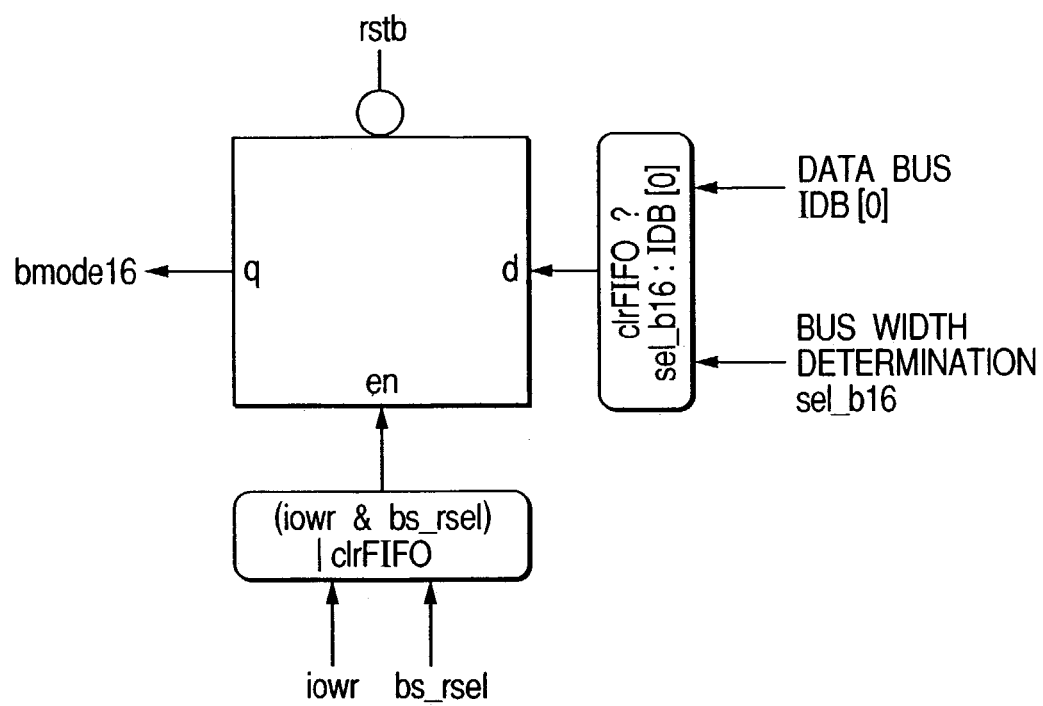
FIG. 35 is a block diagram presenting another configuration for producing the control bit bmod.

FIG. 35 presents another configuration of the flip-flop FFbc for producing the control bit bmode16. An enabling signal shall be provided as the OR ((iowr&bs_rsel)|clrFIFO) of the above AND and a control signal clrFIFO (equivalent to pfb) that directs execution of a branch. When the control signal clrFIFO is active, input data (d) is a signal sel_b16 indicating that an address the bus controller has detected by referencing the internal address bus IAB is a 16-bit bus. Consequently, every time a branch takes place, the bus width of a branch target can be verified and bus modes can be switched automatically. Incidentally, a signal signifying a branch may be the signal clrFIFO or a dedicated signal that is newly produced.

Figure 36:
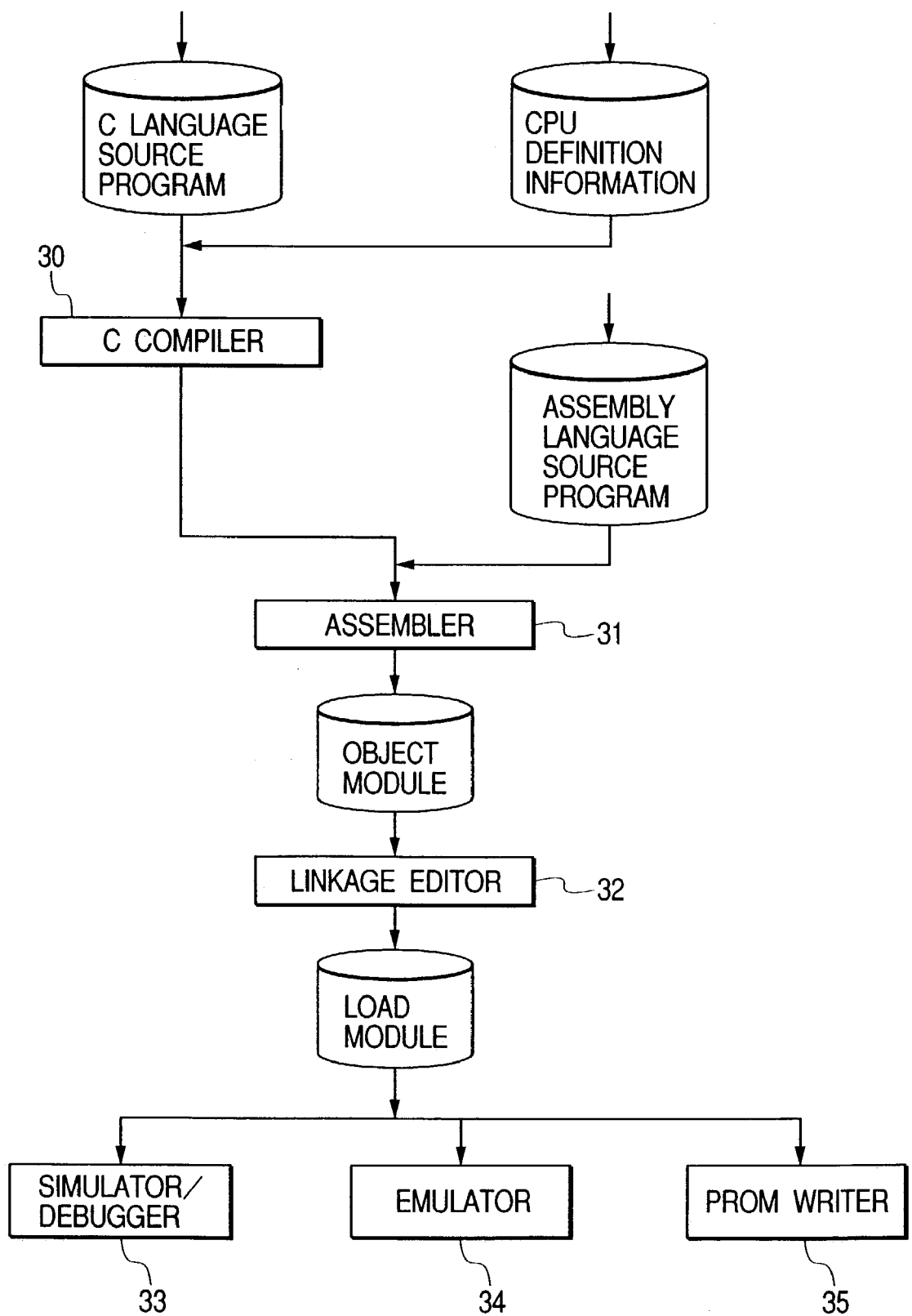
FIG. 36 is an explanatory diagram schematically showing a development environment for programs to be installed in a CPU.

FIG. 36 schematically shows a development environment for development of a program or the like to be run in the CPU 2. A developing engineer uses various editors to produce a program written in C or an assembly language. The program is normally produced by assigning jobs to a plurality of modules. A C compiler 30 receives source programs that are written in C and produced by the developing engineer, and transmits a source program written in the assembly language and an object module. An assembler 31 receives the source program written in the assembly language, and transmits an object module. A linkage editor 32 receives the plurality of object modules produced by the C compiler and assembler, resolves the external references to the modules and the relative addresses thereof, and integrates the modules into one program. The linkage editor 32 then transmits a load module. The load module is transferred to a simulator/debugger 33. Consequently, the actions of a CPU are simulated in a system development device such as a personal computer, and the results of the simulation are displayed in order to analyze or evaluate a program. Moreover, the load module may be transferred to an emulator 34, and so-called in-circuit emulation is performed in order to realize the actions of a microcomputer to be performed in an actual applied system or the like. Thus, the actual actions of the microcomputer can be analyzed or evaluated. Furthermore, the load module may be transferred to a PROM writer 35 so that a produced program can be stored in a flash memory adopted as the built-in ROM of the microcomputer or in an external flash memory. If necessary, the program may be converted into a desired format using an object converter. Otherwise, general-purpose subroutines may be provided as a librarian.

A delay branch instruction may be utilized for the purpose of optimization of the actions of the C compiler 30 or linkage editor 32 or as an option. A program is analyzed in order to analyze an instruction that can be replaced with the branch instruction. A plurality-of-words instruction or plurality-of-execution states instruction can also be utilized effectively as long as it can be allocated to a delay slot period.

According to the aforesaid embodiments, the operation and advantages described below are provided.

(1) [Bus Mode (FIG. 4)]

Instruction reading in units of 16 bits and instruction reading in units of 32 bits can be switched depending on the settings of internal I/O registers. When the width of a data bus contained in an external bus is smaller than the width of a bus on which a built-in ROM is connected, a throughput can be improved according to a way of using a microcomputer, that is, whether a program is stored in a built-in ROM alone or an external ROM alone or whether the built-in ROM or RAM and external ROM are changed for use. An initial value signifying whichever of instruction reading in units of 16 bits and instruction reading in units of 32 bits is designated is determined to signify instruction reading in units of 32 bits. After the microcomputer is reset, whether a program is run over a 32-bit bus or a 16-bit bus, a processing speed represented by an initial value will not be lowered.

Data reading or writing is performed in order to read or write a given number of bits of data. This obviates the necessity of logic for selection. When programs are stored in an external ROM and data is stored in a built-in RAM, a high throughput is achieved.

(2) [Bus Mode (FIG. 1)]

When an inter-module control signal bmode16 is transferred from the bus controller 3 to the CPU 2, the control signal is routed to a flip-flop. Thus, a delay a bus command BCMD undergoes can be inhibited.

An increment value by which the incrementer INC increments data is incremented is controlled based on a bus mode. Therefore, an addressing mode in which an instruction is addressed indirectly via a post-increment register can be used in common. Consequently, resources can be utilized effectively and an increase in a logical scale can be suppressed.

A branch instruction may direct reading of part of an instruction code representing the branch instruction itself. In this case, when instruction reading is performed in units of 16 bits, reading (pre-fetching) of an instruction that is not utilized can be suppressed. Moreover, an increase in the number of execution states deriving from insertion of a wait state can be avoided.

(3) [Delay Branch (FIG. 28 and FIG. 29)]

When a delay branch takes place, after a branch address is read, a value produced by incrementing the branch address is held in the temporary register TR. Thus, even when an instruction code representing a delay slot instruction is long, instruction reading can be performed continuously. Moreover, when the delay slot instruction enters an execution state in which the instruction code representing the delay slot instruction is read or an execution state in which an effective address thereof is calculated, instruction reading is disabled. Thus, reading (pre-fetching) of an instruction that is not utilized can be suppressed. Moreover, an increase in the number of execution states deriving from insertion of a wait state can be avoided. The FIFO buffer FB is not cleared until the EA extension field of the delay slot instruction or an output of an instruction buffer is no longer needed. Consequently, execution of the delay slot instruction can be achieved in a plurality of execution states. But for a Harvard bus or the like, the present invention can be applied to various instruction sets or hardware configurations.

(4) [Delay Branch (FIG. 6, FIG. 26 to FIG. 29)]

Instruction codes representing a delay branch and a normal branch are switched based on the least-significant bit of an instruction code. Thus, an effective address can be calculated in a common manner.

(5) [A Plurality of Bit Shifts (FIG. 14)]

Owing to the employment of the shifter 21 capable of performing shifts of 1, 2, 4, 8, and 16 bit positions, a shift whose occurrence frequency is high can be performed in one execution state. When the shifter 21 is used in combination with another (connected in series with another or used repeatedly), a shift of any bit positions can be achieved. Moreover, an increase in a logical scale can be suppressed.

The selectors included in the shifters select any of five or seven options including no shift and a right or left shift of a certain number of bit positions. The selectors can be realized easily through logical combination. A selector that selects any of multiple options often includes many stages of logical gates due to the logical combination. Therefore, even when the first shifter 27 and second shifter 28 are connected in series with each other, no critical drawback will occur.

(6) [A Plurality of Bit Shifts (FIG. 22)]

A transition to the next instruction and control of the next bit position to be shifted are performed based on a control signal sfcnt. This leads to a simplified logical description and improved use efficiency of resources.

(7) [Multiplier (FIG. 18)]

A multiplication instruction that directs acquisition of the 32 high-order bits of a product of 32 bits by 32 bits is used for division. This contributes to improvement of efficiency in division.

The invention of the present inventor is not limited to the aforesaid embodiment but can be modified in various manners without a departure from the gist of the invention.

For brevity's sake, a word is adopted as the length of an instruction code representing an instruction that directs a plurality of bit shifts or a multiplication instruction that directs acquisition of high-order bits. Alternatively, an instruction may have a length of a plurality of words. A sequence of actions or the timings thereof should merely be modified accordingly. In short, a prefix code should merely be appended to the start of a word, but the sequence of actions or the timings thereof may not be changed. An instruction coding form, instruction set, and a combination thereof, that is, a kind of instructions, an addressing mode, and a combination thereof may be designated arbitrarily. An instruction format can be changed arbitrarily.

The number of bits to be set in a program counter, the size of an address space, the number of areas into which the address space is divided, and any other structure of a control register can be determined arbitrarily.

Instruction reading in units of 16 bits and instruction reading in units of 32 bits are switched based on the settings of internal I/O registers. Alternatively, mode control signals (MD0 and MD1) that are mode signals may be used to designate either of the instruction reading in units of 16 bits and instruction reading in units of 32 bits. An initial value indicating either of the instruction reading in units of 16 bits and instruction reading in units of 32 bits may be able to be determined arbitrarily.

The storage capacity of the FIFO buffer that is an instruction buffer is not limited to eight words but may be two words or more at minimum. If the storage capacity is large, even when an instruction does not assume an omissible execution state, an omissible execution state of a subsequent instruction in which a large number of bits contained in the instruction is treated is omitted. This leads to a balanced total number of bits contained in instructions. Even if the storage capacity is enhanced, a read instruction may be wasted during execution of a branch instruction. Normally or in a steady state, therefore, the number of bits contained in an instruction and saved in the FIFO buffer should not be very large.

The shifter 21 is not limited to the configuration having two stages of shifters but may include three or more stages of shifters. The number of bit positions to be shifted by each shifter can be set to any value. The number of bit positions to be shifted may be specified in immediate data contained in an instruction code or may be designated based on the contents of a general-purpose register.

The detailed configuration of a multiplier, the way of receiving control signals, and the order of changing states may be modified. Moreover, the width of an external bus may be fixed to a value smaller than the width of an internal bus. Moreover, the width of the external bus may be selected from a range of widths smaller than the width of the internal bus. The selection is controlled based on the settings of the bus controller 3 by the CPU 2.

The present invention of the present inventors has been described on the assumption that the invention is implemented in a single-chip microcomputer encompassed by the field of utilization of the invention or the background art of the invention. The present invention is not limited to the single-chip microcomputer but may be implemented in various data processors called a data processor, a microprocessor, a system LSI, or the like. The present invention can be implemented at least in a system that interprets an instruction, treats the instruction, and performs operations.

The advantages provided by the typical constituent features of the present invention disclosed in the present applicant will be described below.

Namely, from the viewpoint of hardware, fast processing can be achieved with an operating frequency unchanged. In other words, the number of execution states required to perform predetermined processing can be reduced, and fast data processing can be achieved. This contributes to improvement of use efficiency of resources in a data processor or a data processing system to which the data processor is adapted. Consequently, the user-friendliness of the data processor can be improved, and a program size can be reduced.

What is claimed is:

1. A data processor, comprising:
    an instruction executing unit including an instruction controller and that outputs an address signal;
    a bus controller that inputs said address signal, and that outputs a bus mode control signal based on one of an internal memory area and an external memory area indicated by said address signal,
    wherein said bus mode control signal indicates an M bits instruction mode or an N bits instruction mode,
    wherein a size of said N bits is twice a size of said M bits,
    wherein said bus mode control signal is changed to said M bits instruction mode when said instruction controller decodes a branch instruction for branching to an address indicating said external memory,
    wherein said instruction executing unit receives said bus mode control signal,
    wherein said instruction controller generates a bus control signal,
    wherein said bus controller receives said bus control signal and said address signal, and controls bus access based on said bus control signal and said address signal,
    wherein said instruction executing unit is operable to access data in said external memory, said data having a word length of M bits,
    wherein said instruction controller outputs said bus control signal indicating a M bits instruction fetch mode when said bus mode control signal is said M bits instruction mode.

2. A data processor according to claim 1,
    wherein said bus control signal is provided using a flip-flop of said bus controller.

3. A data processor according to claim 1,
    wherein said bus mode control signal is changed to said N bits instruction mode when said instruction controller decodes a branch instruction for branching to said internal memory.

4. A data processor according to claim 1, wherein said instruction executing unit includes a selector for selecting an instruction fetch size of M bits or N bits.

5. A data processor according to claim 1,
    wherein said instruction execution unit includes a selector and a program counter,
    wherein said selector selects one of a M bits size or a N bits size for reading an instruction, and
    wherein said program counter is changed by an increment value based on said selected bit size.

6. A data processor according to claim 1,
    wherein said M bits instruction mode and said N bits instruction mode are selected based on mode signals received via a plurality of mode control terminals.

7. A data processor according to claim 6,
    wherein a program counter of the instruction executing unit changes an increment value of the program counter based on the bus mode control signal.

8. A data processor according to claim 1,
    wherein when said instruction controller decodes a branch instruction and executes the branch instruction, the instruction controller requests a fetching of an instruction of a branch target, the instruction controller fetches the instruction of the branch target, and then the instruction controller decodes the instruction of the branch target.

9. A data processor according to claim 1, further comprising:
    an internal memory to store a program which includes an instruction for the instruction executing unit, and
    an external bus unit which accesses said external memory,
    wherein a bus width of said external bus unit is selectable to be smaller than a bus width of the internal bus coupled to the internal memory.

10. A data processor according to claim 1, further comprising:
    a flash memory; and
    an external bus unit which accesses said external memory,
    wherein a bus width of the internal bus is larger than a bus width of said external bus unit.

11. A data processor according to claim 1, wherein the bus mode control signal is set in response to instruction execution, and an initial value of the bus mode control signal indicates an N bits length.

12. A data processor according to claim 1, further comprising:
    an internal flash memory; and
    an external bus unit which accesses the external memory,
    wherein a bus width of the internal bus is N bits, and a bus width of said external bus unit is M bits.

13. A data processor according to claim 4,
    wherein control information of the selector is set by execution of a predetermined instruction by the instruction executing unit, and
    wherein an initial value of the control information indicates N bits.

* * * * *